United States Patent
Manolakos et al.

(10) Patent No.: US 11,533,155 B2
(45) Date of Patent: Dec. 20, 2022

(54) TRIGGERING DEMODULATION REFERENCE SIGNAL BUNDLING

(71) Applicant: QUALCOMM Incorporated, San Diego, CA (US)

(72) Inventors: Alexandros Manolakos, San Diego, CA (US); Gabi Sarkis, San Diego, CA (US); Joseph Binamira Soriaga, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/872,210

(22) Filed: May 11, 2020

(65) Prior Publication Data

US 2020/0389283 A1    Dec. 10, 2020

(30) Foreign Application Priority Data

Jun. 7, 2019   (GR) .............................. 20190100251

(51) Int. Cl.
| | | |
|---|---|---|
| *H04L 5/10* | (2006.01) | |
| *H04L 5/00* | (2006.01) | |
| *H04W 72/12* | (2009.01) | |
| *H04B 7/0456* | (2017.01) | |
| *H04W 72/04* | (2009.01) | |

(52) U.S. Cl.
CPC ............ *H04L 5/10* (2013.01); *H04B 7/0456* (2013.01); *H04L 5/0051* (2013.01); *H04W 72/042* (2013.01); *H04W 72/1257* (2013.01)

(58) Field of Classification Search
None
See application file for complete search history.

(56) References Cited

U.S. PATENT DOCUMENTS

| | | | |
|---|---|---|---|
| 9,755,810 B2 | 9/2017 | Gaal et al. | |
| 11,109,370 B2* | 8/2021 | Kim | ...................... H04L 5/0082 |
| 11,109,383 B2* | 8/2021 | Seo | ........................... H04L 5/00 |
| 2011/0310831 A1* | 12/2011 | Bhattad | ................. H04L 5/0044 |
| | | | 370/329 |

(Continued)

FOREIGN PATENT DOCUMENTS

| | | |
|---|---|---|
| EP | 2922225 A1 | 9/2015 |
| WO | WO-2019068739 A1 | 4/2019 |

OTHER PUBLICATIONS

International Search Report and Written Opinion—PCT/US2020/032436—ISAEPO—dated Aug. 17, 2020.

*Primary Examiner* — Andrew C Oh
(74) *Attorney, Agent, or Firm* — Qualcomm Incorporated

(57) ABSTRACT

Methods, systems, and devices for wireless communications are described. A user equipment (UE) may determine to bundle or not bundle demodulation reference signals (DMRS) of multiple downlink data transmissions using an indication from a base station. The indication may be transmitted via control signaling, such as downlink control information (DCI) from the base station to the UE. For example, a bit of the DCI may be used to dynamically indicate a current precoding in relation to a preceding precoding. For example, the bit may indicate if the current precoding is the same as a previous precoding (e.g., UE may bundle the DMRS), or the bit may indicate that the current precoding is different than the previous precoding (e.g., UE may not bundle DMRS).

30 Claims, 19 Drawing Sheets

(56) References Cited

U.S. PATENT DOCUMENTS

| | | | |
|---|---|---|---|
| 2013/0034070 A1* | 2/2013 | Seo | H04L 5/0044 370/329 |
| 2014/0269519 A1* | 9/2014 | Shan | H04L 5/0053 370/329 |
| 2015/0078271 A1* | 3/2015 | Kim | H04L 5/0048 370/329 |
| 2015/0098437 A1* | 4/2015 | Chen | H04L 5/0044 370/330 |
| 2015/0155993 A1* | 6/2015 | Berggren | H04L 5/0023 370/330 |
| 2015/0180625 A1* | 6/2015 | Park | H04B 7/024 370/329 |
| 2015/0215085 A1* | 7/2015 | Xu | H04L 12/189 370/312 |
| 2015/0249974 A1* | 9/2015 | Lee | H04W 72/042 370/329 |
| 2015/0280876 A1* | 10/2015 | You | H04L 27/2602 370/329 |
| 2015/0312927 A1* | 10/2015 | Ko | H04L 5/005 370/336 |
| 2015/0373694 A1* | 12/2015 | You | H04L 5/0048 370/329 |
| 2016/0013904 A1* | 1/2016 | Seo | H04L 25/0236 370/329 |
| 2016/0014728 A1* | 1/2016 | Seo | H04W 72/04 370/329 |
| 2016/0227520 A1* | 8/2016 | Davydov | H04B 7/0456 |
| 2016/0270059 A1* | 9/2016 | Chen | H04L 5/0051 |
| 2016/0302174 A1* | 10/2016 | Chatterjee | H04B 7/0486 |
| 2017/0134080 A1* | 5/2017 | Rahman | H04L 5/0048 |
| 2018/0011163 A1* | 1/2018 | Han | G01S 5/0236 |
| 2018/0013529 A1* | 1/2018 | You | H04W 24/08 |
| 2018/0026684 A1* | 1/2018 | Wei | H04W 72/1289 370/329 |
| 2018/0034608 A1* | 2/2018 | Seo | H04L 5/0048 |
| 2018/0042028 A1* | 2/2018 | Nam | H04B 7/0486 |
| 2018/0069672 A1* | 3/2018 | Horiuchi | H04L 5/0048 |
| 2018/0145809 A1* | 5/2018 | Kwak | H04L 5/0051 |
| 2018/0227156 A1* | 8/2018 | Papasakellariou | H04L 25/023 |
| 2018/0302889 A1* | 10/2018 | Guo | H04B 7/088 |
| 2018/0324760 A1* | 11/2018 | Yuk | H04L 5/0044 |
| 2018/0331859 A1* | 11/2018 | Kim | H04L 5/0048 |
| 2018/0375636 A1* | 12/2018 | You | H04L 5/0092 |
| 2019/0045490 A1* | 2/2019 | Davydov | H04W 72/0446 |
| 2019/0098610 A1* | 3/2019 | Kim | H04L 27/3488 |
| 2019/0103941 A1* | 4/2019 | Seo | H04L 5/0053 |
| 2019/0123864 A1* | 4/2019 | Zhang | H04B 7/0456 |
| 2019/0159181 A1* | 5/2019 | Manolakos | H04L 5/0051 |
| 2019/0174323 A1* | 6/2019 | Go | H04W 72/042 |
| 2019/0222357 A1* | 7/2019 | Huang | H04W 72/0446 |
| 2019/0222380 A1* | 7/2019 | Manolakos | H04W 72/14 |
| 2019/0253308 A1* | 8/2019 | Huang | H04W 72/10 |
| 2019/0261380 A1* | 8/2019 | Iyer | H04L 5/1469 |
| 2019/0313436 A1* | 10/2019 | Lee | H04W 72/0413 |
| 2019/0319757 A1* | 10/2019 | Manolakos | H04B 7/0413 |
| 2019/0342865 A1* | 11/2019 | Shin | H04W 76/27 |
| 2019/0349126 A1* | 11/2019 | Andgart | H04L 1/0013 |
| 2020/0015275 A1* | 1/2020 | Kim | H04W 74/006 |
| 2020/0076559 A1* | 3/2020 | Yoshimura | H04L 5/003 |
| 2020/0162215 A1* | 5/2020 | Salim | H04W 72/042 |
| 2020/0220703 A1* | 7/2020 | Kim | H04L 5/0051 |
| 2020/0275446 A1* | 8/2020 | Kim | H04W 72/0453 |
| 2021/0092718 A1* | 3/2021 | Chen | H04L 5/0053 |
| 2021/0112538 A1* | 4/2021 | Kim | H04W 72/044 |
| 2021/0144713 A1* | 5/2021 | Seo | H04L 5/00 |
| 2021/0184808 A1* | 6/2021 | Liu | H04L 5/005 |
| 2021/0235503 A1* | 7/2021 | Irukulapati | H04W 74/0833 |

* cited by examiner

TRIGGERING DEMODULATION REFERENCE SIGNAL BUNDLING

CROSS REFERENCE

The present Application for Patent claims the benefit of Greek Provisional Patent Application No. 20190100251 by MANOLAKOS et al., entitled "TRIGGERING DEMODULATION REFERENCE SIGNAL BUNDLING," filed Jun. 7, 2019, assigned to the assignee hereof, and expressly incorporated by reference herein.

BACKGROUND

The following relates generally to wireless communications, and more specifically to triggering demodulation reference signal bundling.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A wireless multiple-access communications system may include a UE that supports reference signal resource bundling. Reference signal resource bundling may be used to improve transmission and reception quality through the use of coherent filtering, which may improve channel estimation.

SUMMARY

The described techniques relate to improved methods, systems, devices, and apparatuses that support triggering demodulation reference signal bundling. Generally, the described techniques provide for dynamic bundling indications that inform a user equipment (UE) to bundle or not bundle demodulation reference signals (DMRS) of multiple downlink data transmissions via an indication from a base station. The bundling indication may be transmitted via control signaling, such as downlink control information (DCI) from the base station to the UE. For example, a bit of the DCI may be used to dynamically indicate a current precoding in relation to a preceding precoding. For example, if a bit value of a current DCI matches the previous indication bit (e.g., 0 and 0, or 1 and 1), this may indicate that the current precoding is the same as a previous precoding. In this case, the UE may perform reference signal bundling (e.g., DMRS bundling). If the bit value is toggled from the previous indication bit (e.g., 0 to 1, or 1 to 0), this may indicate that the current precoding is the different than the previous precoding. In this case, the UE may not perform reference signal bundling.

A method of wireless communication at a UE is described. The method may include identifying a first bundling indicator associated with at least a first demodulation reference signal of a first downlink data transmission, receiving control signaling indicating a second bundling indicator associated with at least a second demodulation reference signal of a second downlink data transmission subsequent to the first downlink data transmission, and determining a precoding to be applied to the second demodulation reference signal based on a comparison of the first bundling indicator and the second bundling indicator.

An apparatus for wireless communication at a UE is described. The apparatus may include a processor, memory coupled with the processor, and instructions stored in the memory. The instructions may be executable by the processor to cause the apparatus to identify a first bundling indicator associated with at least a first demodulation reference signal of a first downlink data transmission, receive control signaling indicating a second bundling indicator associated with at least a second demodulation reference signal of a second downlink data transmission subsequent to the first downlink data transmission, and determine a precoding to be applied to the second demodulation reference signal based on a comparison of the first bundling indicator and the second bundling indicator.

Another apparatus for wireless communication at a UE is described. The apparatus may include means for identifying a first bundling indicator associated with at least a first demodulation reference signal of a first downlink data transmission, receiving control signaling indicating a second bundling indicator associated with at least a second demodulation reference signal of a second downlink data transmission subsequent to the first downlink data transmission, and determining a precoding to be applied to the second demodulation reference signal based on a comparison of the first bundling indicator and the second bundling indicator.

A non-transitory computer-readable medium storing code for wireless communication at a UE is described. The code may include instructions executable by a processor to identify a first bundling indicator associated with at least a first demodulation reference signal of a first downlink data transmission, receive control signaling indicating a second bundling indicator associated with at least a second demodulation reference signal of a second downlink data transmission subsequent to the first downlink data transmission, and determine a precoding to be applied to the second demodulation reference signal based on a comparison of the first bundling indicator and the second bundling indicator.

In some examples of the method, apparatuses, and non-transitory computer-readable medium described herein, determining the precoding may further include operations, features, means, or instructions for determining a same precoding to be applied to the second demodulation reference signal as the precoding applied to the first demodulation reference signal based on the first bundling indicator and the second bundling indicator being the same.

In some examples of the method, apparatuses, and non-transitory computer-readable medium described herein, the same precoding may be determined for a subset of physical resource blocks of the second demodulation reference signal and a subset of physical resource blocks of the first demodulation reference signal based on an overlap of resources for the first downlink data transmission and the second downlink data transmission.

Some examples of the method, apparatuses, and non-transitory computer-readable medium described herein may further include operations, features, means, or instructions for evaluating a channel transmission property of the first downlink data transmission and the second downlink data transmission based on the first bundling indicator and the second bundling indicator being the same, and determining a same precoding to be applied to the second demodulation reference signal as the precoding applied to the first demodulation reference signal based on the evaluation of the channel transmission property of the first downlink data transmission and the channel transmission property of the second downlink data transmission.

In some examples of the method, apparatuses, and non-transitory computer-readable medium described herein, the channel transmission property includes a port identifier, a channel type, a demodulation reference signal pattern, a demodulation reference signal type, a virtual frequency resource allocation, a physical frequency resource allocation, or a combination thereof.

In some examples of the method, apparatuses, and non-transitory computer-readable medium described herein, the determining the same precoding to be applied to the second demodulation reference signal as the precoding applied to the first demodulation reference signal may be based on the channel transmission property of the first downlink data transmission and the second downlink data transmission being the same.

In some examples of the method, apparatuses, and non-transitory computer-readable medium described herein, the channel type includes a physical downlink shared channel type.

In some examples of the method, apparatuses, and non-transitory computer-readable medium described herein, the channel transmission property includes a time unit threshold, and the determining the same precoding to be applied to the second demodulation reference signal as the precoding applied to the first demodulation reference signal may be based on the second demodulation reference signal being within a time period less than the time unit threshold from the first demodulation reference signal.

Some examples of the method, apparatuses, and non-transitory computer-readable medium described herein may further include operations, features, means, or instructions for receiving a third demodulation reference signal, associated with a first downlink channel for a second UE, that may be co-scheduled on a same time-frequency resource and different antenna port as the first demodulation reference signal associated with the first downlink data transmission of the first downlink channel, and receiving a fourth demodulation reference signal, associated with a second downlink channel for the second UE, that may be co-scheduled on a same time-frequency resource and different antenna port as the second demodulation reference signal associated with the second downlink data transmission of the second downlink channel.

Some examples of the method, apparatuses, and non-transitory computer-readable medium described herein may further include operations, features, means, or instructions for determining the same precoding to be applied to the fourth demodulation reference signal as the precoding applied to the third demodulation reference signal based on the first bundling indicator and the second bundling indicator being the same.

Some examples of the method, apparatuses, and non-transitory computer-readable medium described herein may further include operations, features, means, or instructions for receiving a group identifier for the fourth demodulation reference signal that indicates data may be absent in the second downlink channel for the second UE and was absent in the first downlink channel for the second UE, and where determining the same precoding to be applied to the fourth demodulation reference signal as the precoding applied to the third demodulation reference signal may be based on the reception of the group identifier.

Some examples of the method, apparatuses, and non-transitory computer-readable medium described herein may further include operations, features, means, or instructions for determining a different precoding to be applied to the fourth demodulation reference signal as the precoding applied to the third demodulation reference signal based on the first bundling indicator and the second bundling indicator being the same.

Some examples of the method, apparatuses, and non-transitory computer-readable medium described herein may further include operations, features, means, or instructions for identifying a first co-scheduled port bundling indicator associated with the third demodulation reference signal, receiving a second co-scheduled port bundling indicator associated with the fourth demodulation reference signal in the control signaling, and determining a precoding to be applied to the fourth demodulation reference signal with respect to a precoding applied to the third demodulation reference signal based on a comparison of the first co-scheduled port bundling indicator and the second co-scheduled port bundling indicator.

Some examples of the method, apparatuses, and non-transitory computer-readable medium described herein may further include operations, features, means, or instructions for determining a different precoding to be applied to the second demodulation reference signal as the precoding applied to the first demodulation reference signal based on the second bundling indicator being different than the first bundling indicator.

In some examples of the method, apparatuses, and non-transitory computer-readable medium described herein, the second bundling indicator being different than the first bundling indicator includes a bit value of the second bundling indicator being toggled from a bit value of the first bundling indicator.

In some examples of the method, apparatuses, and non-transitory computer-readable medium described herein, the second demodulation reference signal may include operations, features, means, or instructions for determining a same precoding to be applied to each semi-persistent scheduled demodulation reference signal of the set of semi-persistent scheduled demodulation reference signals based on the second bundling indicator; or determining a different precoding to be applied to each semi-persistent scheduled demodulation reference signal of the set of semi-persistent scheduled demodulation reference signals based on the second bundling indicator.

In some examples of the method, apparatuses, and non-transitory computer-readable medium described herein, the control signaling includes DCI.

In some examples of the method, apparatuses, and non-transitory computer-readable medium described herein, a bitfield of the DCI indicates both demodulation reference signal port indices and the second bundling indicator associated with the demodulation reference signal.

A method of wireless communication at a base station is described. The method may include transmitting a first bundling indicator associated with at least a first demodulation reference signal of a first downlink data transmission, determining a precoding to be applied to a second demodulation reference signal of a second downlink data transmission, subsequent to the first downlink data transmission, and transmitting control signaling indicating a second bundling indicator associated with at least the second demodulation reference signal based on a comparison of the precoding to be applied to the second demodulation reference signal with the precoding applied to the first demodulation reference signal.

An apparatus for wireless communication at a base station is described. The apparatus may include a processor, memory coupled with the processor, and instructions stored in the memory. The instructions may be executable by the processor to cause the apparatus to transmit a first bundling indicator associated with at least a first demodulation reference signal of a first downlink data transmission, determine a precoding to be applied to a second demodulation reference signal of a second downlink data transmission, subsequent to the first downlink data transmission, and transmit control signaling indicating a second bundling indicator associated with at least the second demodulation reference signal based on a comparison of the precoding to be applied to the second demodulation reference signal with the precoding applied to the first demodulation reference signal.

Another apparatus for wireless communication at a base station is described. The apparatus may include means for transmitting a first bundling indicator associated with at least a first demodulation reference signal of a first downlink data transmission, determining a precoding to be applied to a second demodulation reference signal of a second downlink data transmission, subsequent to the first downlink data transmission, and transmitting control signaling indicating a second bundling indicator associated with at least the second demodulation reference signal based on a comparison of the precoding to be applied to the second demodulation reference signal with the precoding applied to the first demodulation reference signal.

A non-transitory computer-readable medium storing code for wireless communication at a base station is described. The code may include instructions executable by a processor to transmit a first bundling indicator associated with at least a first demodulation reference signal of a first downlink data transmission, determine a precoding to be applied to a second demodulation reference signal of a second downlink data transmission, subsequent to the first downlink data transmission, and transmit control signaling indicating a second bundling indicator associated with at least the second demodulation reference signal based on a comparison of the precoding to be applied to the second demodulation reference signal with the precoding applied to the first demodulation reference signal.

Some examples of the method, apparatuses, and non-transitory computer-readable medium described herein may further include operations, features, means, or instructions for applying a same precoding to the second demodulation reference signal as the precoding applied to the first demodulation reference signal, where the first bundling indicator may be the same as the second bundling indicator.

In some examples of the method, apparatuses, and non-transitory computer-readable medium described herein, the same precoding may be applied to a subset of the second demodulation reference signal and a subset of the first demodulation reference signal based on an overlap of resources for the first downlink data transmission and the second downlink data transmission.

In some examples of the method, apparatuses, and non-transitory computer-readable medium described herein, the second bundling indicator being the same as the first bundling indicator includes a bit value of the second bundling indicator may be the same as a bit value of the first bundling indicator.

Some examples of the method, apparatuses, and non-transitory computer-readable medium described herein may further include operations, features, means, or instructions for applying a different precoding to the second demodulation reference signal as the precoding applied to the first demodulation reference signal, and toggling a bit value of the second bundling indicator from a bit value of the first bundling indicator.

Some examples of the method, apparatuses, and non-transitory computer-readable medium described herein may further include operations, features, means, or instructions for transmitting a third demodulation reference signal, associated with a first downlink channel of a second UE, that may be co-scheduled on a same time-frequency resource and different antenna port as the first demodulation reference signal associated with the first downlink data transmission of the first downlink channel, and transmitting a fourth demodulation reference signal, associated with a second downlink channel of a second UE, that may be co-scheduled on a same time-frequency resource and different antenna port as the second demodulation reference signal associated with the second downlink data transmission of the second downlink channel.

Some examples of the method, apparatuses, and non-transitory computer-readable medium described herein may further include operations, features, means, or instructions for applying a same precoding to the fourth demodulation reference signal as the precoding applied to the third demodulation reference signal, where the first bundling indicator may be the same as the second bundling indicator.

Some examples of the method, apparatuses, and non-transitory computer-readable medium described herein may further include operations, features, means, or instructions for transmitting a group identifier for the fourth demodulation reference signal that indicates data may be absent in the second downlink channel for the second UE and was absent in the first downlink channel for the second UE.

Some examples of the method, apparatuses, and non-transitory computer-readable medium described herein may further include operations, features, means, or instructions for applying a different precoding to the fourth demodulation reference signal as the precoding applied to the third demodulation reference signal, where the first bundling indicator may be the same as the second bundling indicator.

Some examples of the method, apparatuses, and non-transitory computer-readable medium described herein may further include operations, features, means, or instructions for identifying a first co-scheduled port bundling indicator associated with the third demodulation reference signal, determining a precoding to be applied to the fourth demodulation reference signal with respect to a precoding applied to the third demodulation reference signal, and transmitting a second co-scheduled port bundling indicator associated with the fourth demodulation reference signal in the control signaling based on the first co-scheduled port bundling indicator.

In some examples of the method, apparatuses, and non-transitory computer-readable medium described herein, the second demodulation reference signal may include operations, features, means, or instructions for applying a same precoding to each semi-persistent scheduled demodulation reference signal of the set of semi-persistent scheduled demodulation reference signals, and transmitting the second bundling indicator based on the application of the same precoding to each semi-persistent scheduled demodulation reference signal.

In some examples of the method, apparatuses, and non-transitory computer-readable medium described herein, the second demodulation reference signal may include operations, features, means, or instructions for applying a different precoding to each semi-persistent scheduled demodulation reference signal of the set of semi-persistent scheduled demodulation reference signals, and transmitting the second bundling indicator based on the application of the different precoding to each semi-persistent scheduled demodulation reference signal.

In some examples of the method, apparatuses, and non-transitory computer-readable medium described herein, the control signaling includes DCI.

In some examples of the method, apparatuses, and non-transitory computer-readable medium described herein, a bitfield of the DCI indicates both demodulation reference signal port indices and the second bundling indicator associated with the demodulation reference signal.

DETAILED DESCRIPTION

Figure 1:
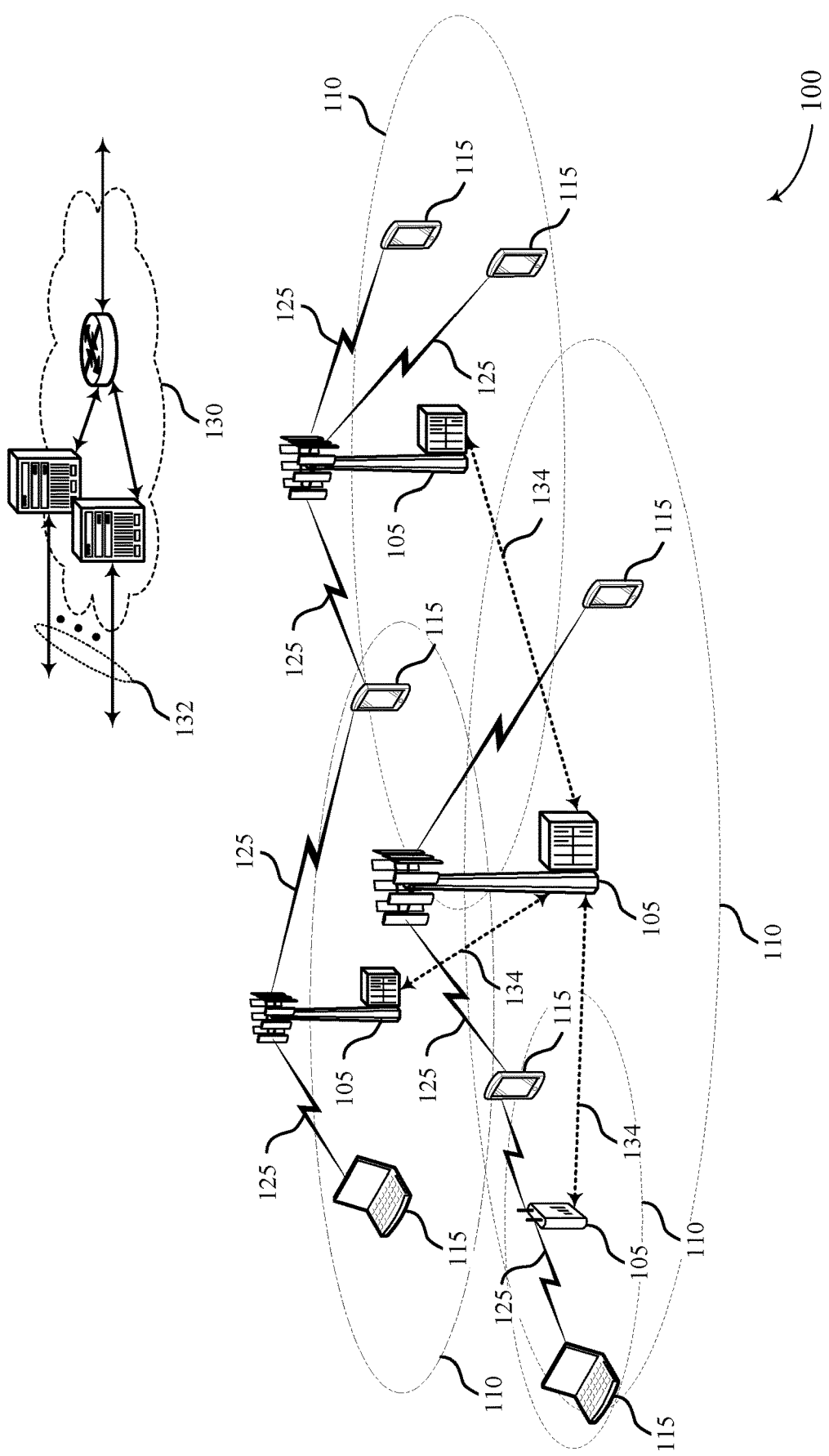
FIG. 1 illustrates an example of a system for wireless communications that supports triggering demodulation reference signal bundling in accordance with aspects of the present disclosure.

In some wireless communications systems, a base station and a user equipment (UE) may transmit and receive various reference signals associated with data transmissions, such as demodulation reference signals (DMRSs). A DMRS may include, for example, a reference signal communicated with a data transmission (either downlink, uplink, or sidelink). A DMRS may be communicated using a DMRS pattern, where the DMRS pattern may include a set of parameters defining a resource allocation of time, frequency, and spectral resources for the DMRSs, a multiplexing scheme and/or an antenna port mapping for the DMRSs in the frequency, time, and code domain, a scrambling code to be applied to the DMRSs, and the like. The UE may use DMRSs to estimate channel characteristics (e.g., via channel quality measurements) of the channel or channels on which the base station and the UE communicate data. The UE may then use the estimated channel characteristics to perform demodulation and/or decoding of transmissions communicated over the estimated channel.

In some cases, a UE may bundle the DMRS of one or more received data transmission (e.g., two subsequent downlink data transmissions) from the base station based on a new bundling indicator (NBI). When a UE performs DMRS bundling, the base station may configure parameters that are common across a bundle of time resources (e.g., transmission time intervals (TTIs)), such as a common precoding, to coherently transmit the DMRSs in each of the TTIs of each respective bundle on an antenna port. Accordingly, the UE may assume that a common precoder is used to transmit the DMRSs across some or all of the data channels of each bundle. In this way, the UE may coherently filter the received DMRSs to improve the accuracy of its channel estimation procedures by jointly processing the DMRSs received in each bundle.

The UE may determine to bundle or not bundle the reference signals (e.g., DMRS) of data transmissions using the NBI received from the base station. The NBI may be transmitted via control signaling (e.g., downlink control information (DCI)) to the UE. For example, a single bit of the DCI may be used to dynamically indicate the relation of a current precoding with respect to a previous precoding. For example, the bit may indicate if the current precoding is the same as a previous precoding, or the bit may indicate that the current precoding is different than the previous precoding. In some cases, the precoding may not change often, and the use of a single bit NBI may allow for more efficient processing compared to a bundling indication that includes multiple bits to indicate if bundling may occur and separately indicate the resources that the bundling indication may apply to (e.g., do not bundle with previous resource and bundle with next resource).

In some examples, a DCI bit may indicate that the current precoding (e.g., the precoding for the DMRS received in the downlink transmission associated with the DCI) is the same as a previous precoding (e.g., a precoding for the DMRS received in a previous downlink transmission). However, in some examples, even if the DCI bit indicates that the UE should perform DMRS bundling, the UE may check one or more channel transmission parameters of the first and second data transmissions and perform DMRS bundling based on the channel transmission parameters, which may include channel transmission properties. When the one or more channel transmission parameters (e.g., port ID, physical downlink shared channel (PDSCH) type, DMRS pattern, and DMRS type) are the same across the first and second downlink data transmissions, the UE may bundle the DMRS of the data transmissions (or portions of the data transmissions). When the one or more channel transmission parameters are different, the UE may not be expected to bundle the DMRS of the data transmissions (or may only bundle portions of the data transmissions that are the same).

Other channel conditions or channel transmission parameters may be evaluated at the UE to determine when to bundle the DMRS of a data transmission with the DMRS of a previous data transmission. These channel transmission parameters may include a threshold period in time between data channels, precoded resource groups (PRGs), virtual frequency domain allocation, and physical frequency domain allocation. When the one or more channel transmission parameters (e.g., PRGs, virtual resource blocks (VRBs), and physical resource blocks (PRBs)) are different, the UE may not be expected to bundle a portion or all of the DMRS of the data channels.

The UE may bundle co-scheduled ports based on the NBI. Co-scheduled ports may refer to a pair of different ports that are schedule for the same time-frequency resources (e.g., one port may be at a first UE and another port may be at a second UE). In some cases, an NBI may also be used for semi-persistent scheduled (SPS) transmissions between the base station and the UE.

Aspects of the disclosure are initially described in the context of a wireless communications system. Additionally, aspects of the disclosure are illustrated through additional wireless communications systems, data channel configurations, and process flows. Aspects of the disclosure are further illustrated by and described with reference to apparatus diagrams, system diagrams, and flowcharts that relate to triggering demodulation reference signal bundling.

FIG. 1 illustrates an example of a wireless communications system 100 that supports triggering demodulation reference signal bundling in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications system 100 may support DMRS bundling where the base station 105 may configure common parameters, such as a common precoding, to coherently transmit the DMRSs across a bundle of time units (e.g., TTIs) or data transmissions. Accordingly, the UE 115 may assume that a common precoder is used to transmit the DMRSs across some or all of a plurality of data transmissions. In this way, the UE 115 may coherently filter the received DMRSs (e.g., leveraging knowledge of a common phase of the DMRSs across TTIs of one bundle) to improve the accuracy of its channel estimation procedures by jointly processing the DMRSs received in each bundle.

In some cases, UE 115 may determine to bundle or not bundle the reference signals (e.g., DMRS) of downlink data transmissions using an indication from base station 105. The indication may be referred to as an NBI and may be transmitted via control signaling (e.g., DCI) from base station 105 to UE 115. For instance, a single bit of the DCI may be used to dynamically indicate the relation of a current precoding as compared to a preceding precoding. For example, the bit may indicate if the current precoding is the same as a previous precoding, or the bit may indicate if the current precoding is different than the previous precoding.

Figure 2:
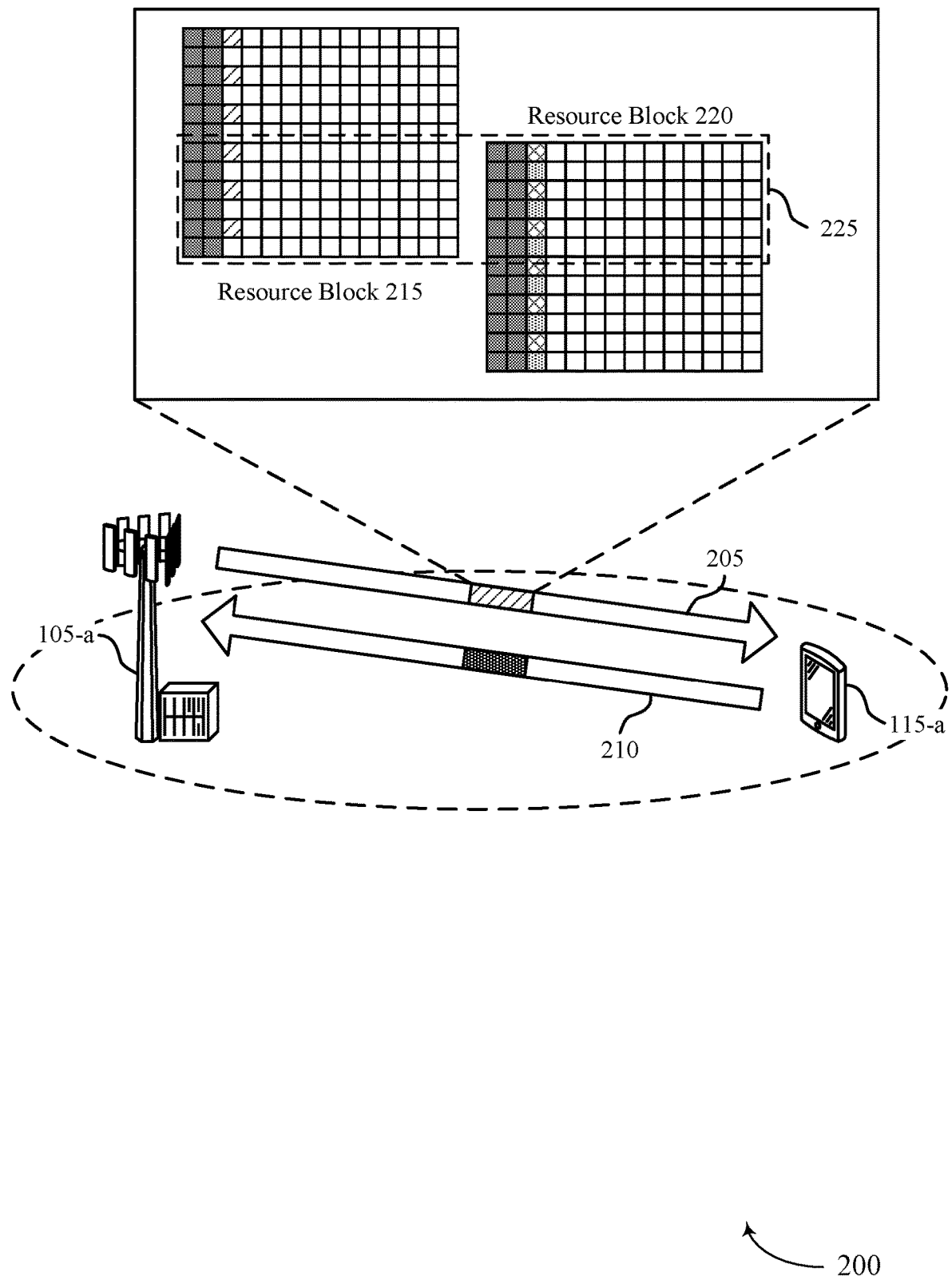
FIG. 2 illustrates an example of a system for wireless communication that supports triggering demodulation reference signal bundling in accordance with aspects of the present disclosure.

FIG. 2 illustrates an example of a wireless communications system 200 that supports triggering demodulation reference signal bundling in accordance with aspects of the present disclosure. In some examples, wireless communications system 200 may implement aspects of wireless communications system 100. Wireless communications system 200 may include a base station 105-a and a UE 115-a, which may be examples of corresponding base stations 105 and UEs 115, respectively, as described herein with reference to FIG. 1.

Base station 105-a may transmit downlink messages to UE 115-a on resources of a carrier 205, and UE 115-a may transmit uplink messages to base station 105-a on resources of a carrier 210. In some cases, carriers 205 and 210 may be a same carrier or may be separate carriers. Exemplary downlink data transmissions are shown in detail and may include resource block 215 (e.g., a first PDSCH) and resource block 220 (e.g., a second PDSCH) transmitted after resource block 215.

As described herein, UE 115-a may determine whether to bundle, which may refer to time domain bundling, the reference signals (e.g., DMRS) of resource block 215 and resource block 220. Bundling may refer to a receiver (e.g., UE 115-a) assuming a same precoder has been applied across multiple data transmissions or data channels of different scheduling units (e.g., a first PDSCH transmission and the following PDSCH transmission) including the DMRS associated with each downlink data transmission on the data channel, and a transmitter (e.g., base station 105-a) may coherently transmit reference signals (e.g., DMRS) associated with the data channels over different time instances (e.g., TTIs, slots, or mini-slots) on an antenna port. Additionally, the receiver may jointly process and/or coherently filter the different reference signals received with each data channel to improve channel estimation. Bundling may occur over time or across frequencies or both.

In some cases, UE 115-a may determine whether to bundle the reference signals (e.g., DMRS) of resource block 215 and resource block 220 using an indication, such as an NBI, from base station 105-a. The NBI may be transmitted via control signaling (e.g., DCI) to UE 115-a. For instance, a single bit of the DCI may be used for the NBI, which may dynamically indicate whether the current precoding for the current DMRS is the same as a previous precoding for DMRS. In some cases, the precoding includes the precoder or other precoding parameters applied to the DMRS that is determined by the base station 105-a.

In some examples, the NBI may indicate that the current precoding (e.g., of resource block 220) is the same as a previous precoding (e.g., of resource block 215, which may have been received earlier). In some cases, even though the NBI indicates that bundling is possible for resource blocks 215 and 220, the UE 115-a checks that one or more channel characteristics of resource blocks 215 and 220 are satisfied to determine whether to perform bundling of the DMRS of resource block 215 and 220. In some cases, rather than not bundling any of the reference signal resources, the UE 115-a may perform partial reference signal resource bundling when the NBI is not toggled and a certain transmission parameter is the same between successive downlink data transmissions.

In a first example bundling category, the DMRS is bundled for the whole PDSCH if the NBI indicates bundling and if certain channel transmission parameters of resource blocks 215 and 220 are met. In a second example bundling category, the DMRS may be bundled for the whole PDSCH if the NBI indicates bundling and if resource blocks 215 and 220 are received within a threshold time of each other. In a third example bundling category, portions of the resource blocks 215 and 220 are bundled if the NBI indicates bundling and if certain channel transmission parameters for those portions are met or are the same.

An example of the first bundling category may include UE 115-a bundling the DMRS of all of resource blocks 215 and 220 when the same base station port IDs are used for the DMRSs of resource blocks 215 and 220. If different base station port IDs are used for the DMRSs of resource block 215 and 220, then bundling may not occur since resource block 215 and resource block 220 would be different PDSCH channels.

Another example of the first bundling category may include UE 115-a bundling the DMRS of resource block 215 and 220 when resource block 215 and resource block 220 are of the same Type (e.g., both Type A or both Type B). In some examples, DMRS may be mapped in a slot in two different ways, which may also be referred to as PDSCH mapping types. In some cases, a location of the initial DMRS transmission and locations of any subsequent DMRS transmissions may be determined according to parameters configured by higher layers and a time-domain allocation of resources for the data transmissions (e.g., a time-domain resource allocation for a PDSCH). For example, the location of the initial DMRS transmission may be given by I. The value of I may be obtained, for example, from a look-up table according to a parameter $l_d$. The parameter given by $l_d$ may represent a duration including the data transmissions and the DMRS transmissions. In some cases, the duration given by $l_d$ may depend on the mapping type for the data transmissions. For example, according to the PDSCH mapping type A, $l_d$ may be defined as the duration between a first symbol of a TTI and a last symbol of the TTI including resources allocated for PDSCH. In another example, according to the PDSCH mapping type B, $l_d$ may be defined according to the number of symbols that include resources allocated for data transmissions (e.g., the symbols that include resources scheduled for PDSCH). For instance, the duration that defines $l_d$ may begin at the sixth symbol (e.g., symbol 5) of a resource block and ends at the ninth symbol (e.g., symbol 8) of the resource block, which are the symbols that span the time resources allocated for data transmissions (e.g., PDSCH communications). Type A and Type B PDSCH may have different DMRS patterns, which may increase the complexity for UE 115-a to perform bundling, and thus, bundling of the DMRS of resource block 215 and resource block 220 may not be needed when different PDSCH mapping types are present.

Another example of the first bundling category may include UE 115-a bundling the DMRSs of resource blocks 215 and 220 when the same DMRS pattern with respect to the time-frequency location of DMRS symbols within resource blocks 215 and 220 is present. In some cases, the base station 105-a may communicate the DMRSs according to a pattern (e.g., a DMRS pattern) that may specify, for example, one or more of: a set of parameters defining a resource allocation of time, frequency, and spectral resources for the DMRSs, a multiplexing scheme and/or an antenna port mapping for the DMRSs in the frequency, time, and code domain, a scrambling code to be applied to the DMRSs, and the like. UE 115-a may perform bundling of the DMRSs of resource blocks 215 and 220 when the same DMRS pattern with respect to the time-frequency location of DMRS symbols within resource blocks 215 and 220. The same time-frequency DMRS pattern may allow for a lower complexity bundling operation than if DMRS time-frequency locations were different for resource block 215 and 220.

Another example of the first bundling category may include UE 115-a bundling the DMRS of resource blocks 215 and 220 when the same DMRS type (e.g., Type 1 or 2) is used between resource blocks 215 and resource block 220. DMRS Type 1 may refer to single symbol or double symbol DMRS where six resource elements may be used per port. DMRS Type 2 may refer to single symbol or double symbol DMRS where four resource elements may be used per port.

According to the first bundling category, when the one or more channel transmission parameters (e.g., port ID, PDSCH type, DMRS pattern, and DMRS type) are the same, UE 115-a may bundle the DMRS of resource block 215 and resource block 220 to improve channel estimation. When the one or more channel transmission parameters (e.g., port ID, PDSCH type, DMRS pattern, and DMRS type) are different, UE 115-a may not bundle the DMRS of resource block 215 and resource block 220. In some examples, UE 115-a may convey its capabilities to handle complex bundling to base station 105-a. Base station 105-a may schedule resource block 215 and 220 accordingly.

An example of the second bundling category may include UE 115-a bundling the DMRS of resource blocks 215 and 220 when resource blocks 215 and 220 are received within a threshold period in time between one another. For example, if resource block 215 and 220 are within X (e.g., X may be 0, 2, or 5) slots or symbols of one another bundling may occur, and if resource block 215 and 220 are not within X slots or symbols of one another bundling may not occur. For instance, UE 115-a may clear the stored DMRS after every X slot or symbols when DMRS is not received.

An example of the third bundling category may include UE 115-a bundling the DMRS of resource block 215 and 220 for the same precoded resource groups (PRGs) across resource block 215 and 220, and different PRGs across resource block 215 and 220 may not be bundled. In some cases, UE 115-a may perform bundling of the DMRS of resource block 215 and 220 when the virtual frequency domain allocation for resource block 215 and resource block 220 is the same. For instance, the resource allocation type may still be different, but both resource block 215 and 220 are mapped on the same virtual resource blocks (VRBs). In yet another example, UE 115-a may perform bundling of the DMRS of resource block 215 and 220 when the physical frequency domain allocation for resource block 215 and resource block 220 is the same. For instance, the resource allocation type may still be different, but both resource block 215 and 220 are mapped on the same PRBs. When the one or more channel transmission parameters (e.g., PRGs, VRBs, and PRBs) are different, UE 115-a may not bundle a portion or all of the DMRS of resource block 215 and resource block 220.

Box 225 encompasses a subset of physical resource blocks (PRBs) in resource block 215 and a subset of PRBs in resource block 220. According to aspects of this disclosure, bundling of DMRS of resource block 215 and resource block 220 may occur at the identified subsets of PRBs. For example, bundling may occur across PDSCHs on the same frequency, and thus, the subset of PRBs of resource block 215 and resource block 220 that overlap in frequency may be bundled.

In some cases, bundling of co-scheduled ports may be considered based on the NBI. Co-scheduled ports may refer to a pair of different ports that are schedule for the same time-frequency resources (e.g., one port may be at a first UE 115-*a* and another port may be at a second UE). In some examples, UE 115-*a* may perform bundling of the DMRS of resource block 215 and 220 for a first port and a second port. For example, when UE 115-*a* is signaled the NBI for its own ports, the potential co-scheduled ports may be bundled or not bundled in a same way as the scheduled ports. In another example, UE 115-*a* may not perform bundling of the DMRS of resource block 215 and 220 for a first port and a second port. For example, the NBI applies only to scheduled ports, and UE 115-*a* may assume that the potential co-scheduled ports are not DMRS time-domain bundled across two data channel (e.g., PDSCH) allocations. In yet another example, an additional DCI toggling bit may be included in the NBI that may inform UE 115-*a* whether the potential co-scheduled ports may be assumed to be bundled with those from the previous PDSCH transmission. In another example, when a specific code domain multiplexed (CDM) group ID is signaled that does not contain data across resource blocks 215 and 220, and UE 115-*a* is informed to perform DMRS bundling across resource blocks 215 and 220, then UE 115-*a* will assume that the specific CDM group ID contains potential co-scheduled DMRS ports that are time-domain bundled between resource block 215 and 220. These co-scheduled port considerations are discussed in greater detail with respect to FIG. 3.

The NBI may be transmitted in a number of ways using the DCI. For instance, the DCI bit of legacy DCI format 1_1 which is now used for PRG indication may be reused for the NBI. In some cases, the DCI format may be semi-statically configured for when the bit is used for PRG or for DMRS NBI. Alternatively, the NBI may be jointly encoded with the DMRS port indication table in a single bitfield that may include six bits (e.g., two different bitfields may indicate two different entries in the table may indicate the same DM-RS port indices and different NBIs). For example, the table may include two entries with port indices (e.g., 0 and 1) where the first entry corresponds to a first NBI (e.g., 0), and the second entry corresponds to a second NBI (e.g., 1).

An NBI may also be used for semi-persistent scheduled (SPS) transmissions between base station 105-*a* and UE 115-*a*. For example, for downlink SPS without a grant, an NBI may be included in the activation command for the SPS. If UE 115-*a* receives an activation command (e.g., via a MAC control element (CE)) with NBI (e.g., NBI equal to 1 or 0), this would indicate that all data channels (e.g., PDSCHs) transmitted within the SPS activated would be bundled, unless the channel transmission parameters described herein are not satisfied. In some cases, if there are multiple SPS configurations, the MAC CE command which includes the NBI, may be applied to a one or more of the SPS configurations.

Figure 3:
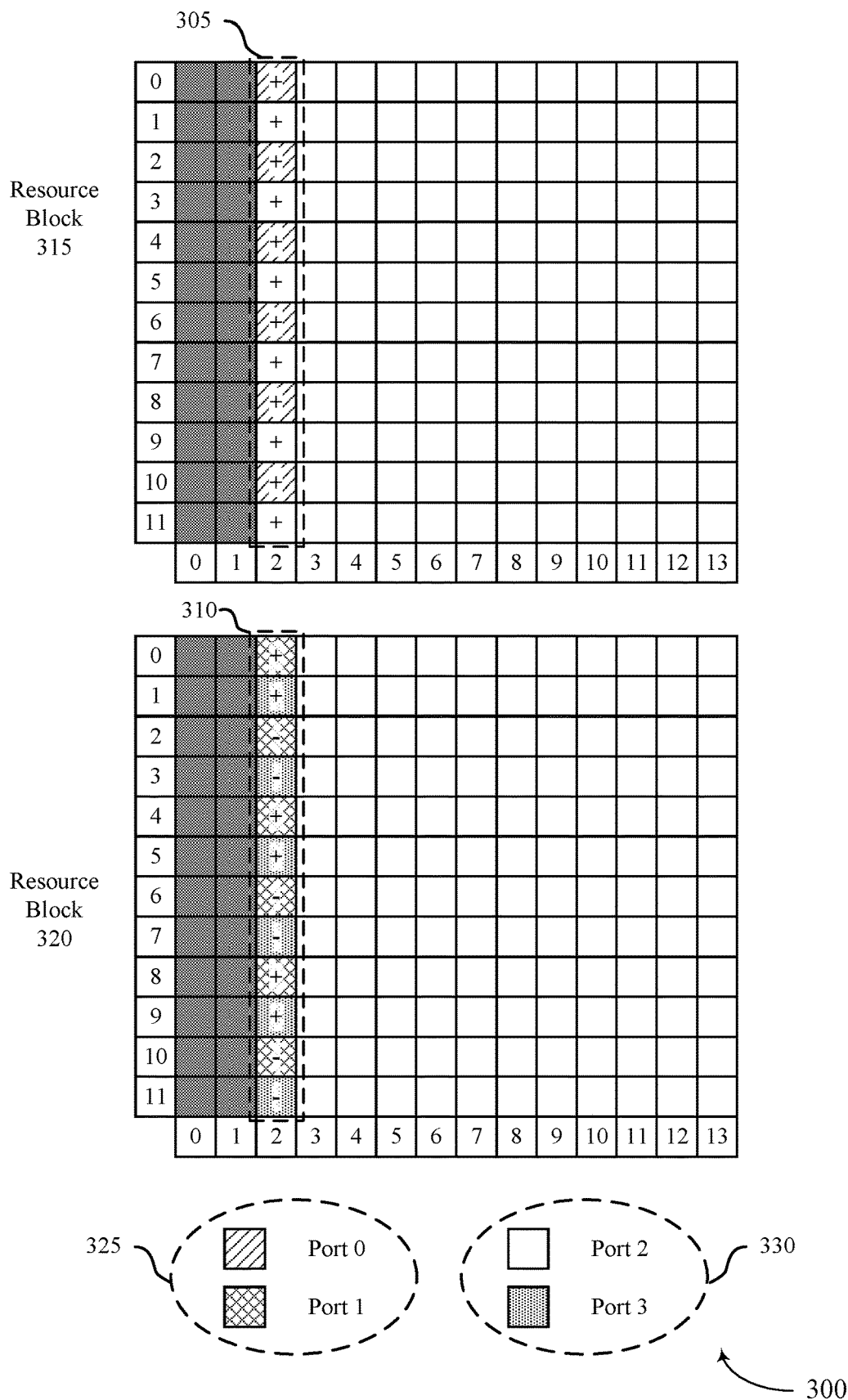
FIG. 3 illustrates an example of resource block configurations that support triggering demodulation reference signal bundling in accordance with aspects of the present disclosure.

FIG. 3 illustrates an example of resource block configurations 300 that support triggering demodulation reference signal bundling in accordance with aspects of the present disclosure. In some examples, data channel configurations 300 includes resource block 315 and resource block 320, which may implement aspects of resource blocks 215 and 220 of wireless communications system 200. As described herein, a UE may determine whether to bundle DMRS of consecutive data transmissions or data channels based on an NBI and additional channel transmission parameters. The NBI may also be used for bundling indications for co-scheduled ports. Co-scheduled ports may refer to two or more different ports that are schedule for the same time-frequency resources (e.g., one port may be at a first UE and another port may be at a second UE).

Resource block 315 and 320 may include DMRS 305 and 310, respectively. The DMRS 305 and 310 is illustrated as Type 1 single symbol DMRS, but the aspects described herein may also apply to different DMRS types such as Type 2, and single or double symbol. DMRS 305 and 310 is shown in symbol period 2 of resource block 315, DMRS 305 of resource block 315 may include six resource elements per port illustrated by the different patterns in FIG. 3, six resource elements for port 0 and six resource elements port 2. DMRS 310 of resource block 320 may also include six resource elements per port illustrated by the different patterns in FIG. 3, six resource elements for port 1 and six resource elements port 3. Port 0 and port 1 may make up a first CDM group 325. Port 2 and port 3 may make up a second CDM group 330, which may be different than CDM group 325.

In some cases, multiple user-multiple input multiple output (MU-MIMO) paired ports may have the same DMRS pattern. The frequency domain PRG of MU-MIMO paired ports on the same CDM group may be the same. The CDM groups indicated as empty of data (e.g., data is absent), may contain MU-MIMO paired ports, which may allow a UE to estimate channel condition based on DMRS in a co-scheduled port.

In some cases, bundling of co-scheduled ports (e.g., ports 0 and 1, and ports 2 and 3) may be determined based on an NBI for scheduled port(s) (e.g., port 0). In some examples, UE 115-*a* may perform bundling of the DMRS of resource block 315 and 320 for a first port and a second port (e.g., ports 0 and 1, or ports 2 and 3). For example, when UE is signaled the NBI for its own ports (e.g., ports 0 and 2), the potential co-scheduled ports (e.g., ports 1 and 3, respectively) may be bundled or not bundled in a same way as the scheduled ports. In another example, UE may not perform bundling of the DMRS of resource block 315 and 320 for a first port and a second port. In other words, the bundling indication may apply only to scheduled ports, and the UE may assume that the potential co-scheduled ports are not DMRS time-domain bundled across two data channel (e.g., PDSCH) allocations.

In yet another example, an additional DCI toggling bit may be included in the NBI that may inform the UE whether the potential co-scheduled ports (e.g., port 1 and 3) may be assumed to be bundled with those from a preceding PDSCH transmission. In another example, when a specific CDM group ID (e.g., group 320 or 330) is signaled that does not contain data across resource block 315 and 320, and the UE may be informed to perform DMRS bundling across resource block 315 and 320. Then, the UE will assume that the specific CDM group ID contains potential co-scheduled DMRS ports that are time-domain bundled between resource block 315 and 320.

Figure 4:
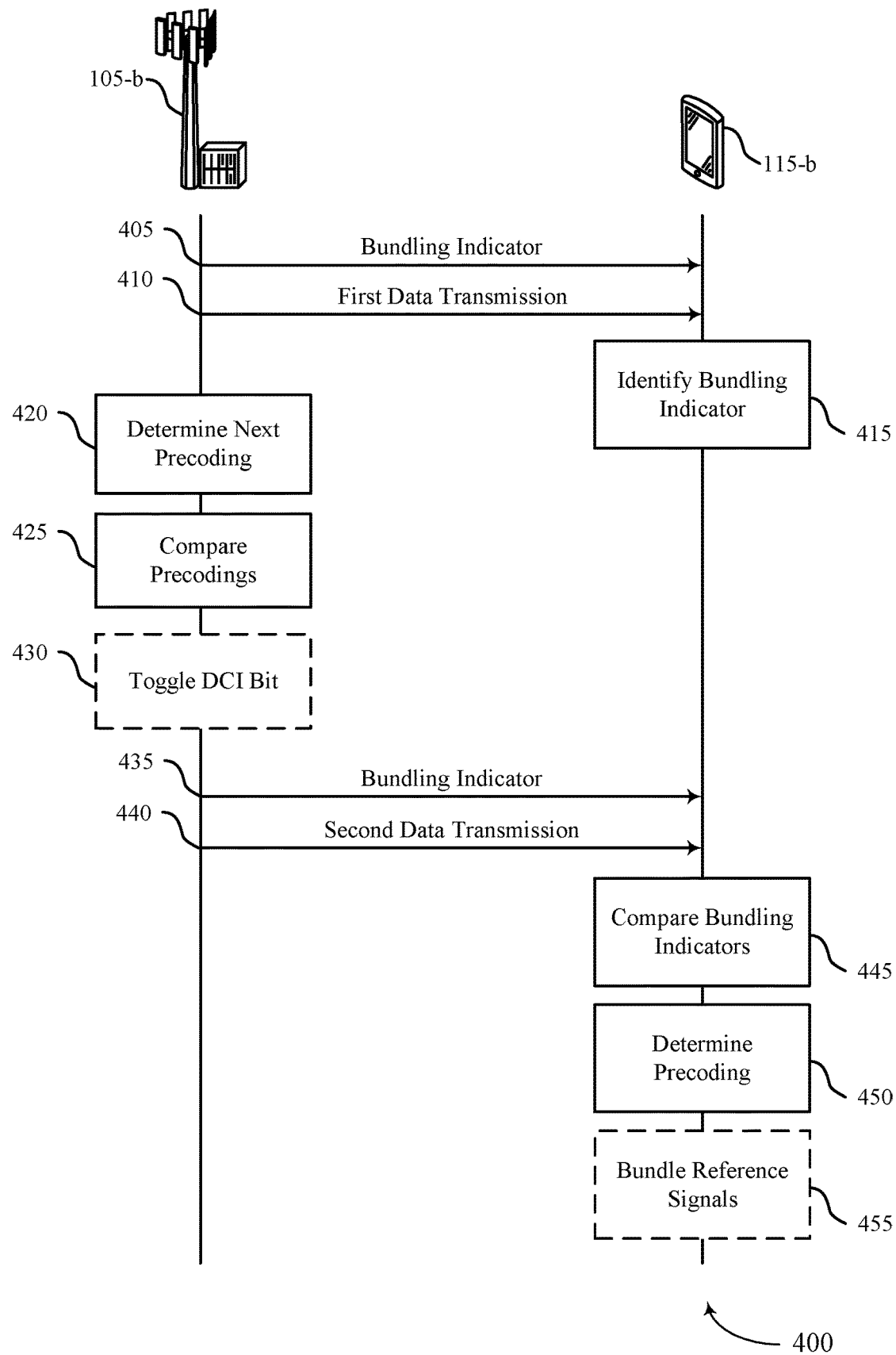
FIG. 4 illustrates an example of a process flow that supports triggering demodulation reference signal bundling in accordance with aspects of the present disclosure.

FIG. 4 illustrates an example of a process flow 400 that supports triggering demodulation reference signal bundling in accordance with aspects of the present disclosure. In some examples, process flow 400 may implement aspects of wireless communications systems 100 and/or 200. Process flow 400 may include a base station 105-*b* and a UE 115-*b*, which may be examples of corresponding base stations 105 and UEs 115, respectively, as described herein with reference to FIGS. 1-3.

In the following description of the process flow 400, the operations between UE 115-*b* and base station 105-*b* may be transmitted in a different order than the order shown, or the operations performed by base station 105-*b* and UE 115-*b* may be performed in different orders or at different times. Certain operations may also be left out of the process flow 400, or other operations may be added to the process flow 400. It is to be understood that while base station 105-*b* and UE 115-*b* are shown performing a number of the operations of process flow 400, any wireless device may perform the operations shown.

At 405, base station 105-*b* may transmit, to UE 115-*b*, a bundling indicator (e.g., NBI via DCI) associated with a first demodulation reference signal of a first downlink data transmission (e.g., the data transmission transmitted at 410). In some cases, the NBI may include a bit of DCI that indicates the precoding of the first demodulation reference signal of the first downlink data transmission in relation to a previous precoding of the previous data channel (e.g., previous PDSCH). At 410, base station 105-*b* may transmit, to UE 115-*b*, a data transmission (e.g., a PDSCH). As described with reference to FIGS. 2-3, a reference signal of the data transmission (e.g., a DMRS) may be precoded according to the NBI transmitted at 405. The bundling indicator may be transmitted in the same transmission as the first data transmission (e.g., as part of control signaling associated with the data transmission).

At 415, UE 115-*b* may identify the NBI associated with the first demodulation reference signal of the first downlink data transmission. For example, the UE 115-*b* may store or recall the NBI received at 405.

At 420, base station 105-*b* may determine a precoding to be applied to a second demodulation reference signal of a second downlink data transmission (e.g., the data transmission transmitted at 440), which may be subsequent to the first downlink data transmission (e.g., the data transmission transmitted at 410). Whether the precoding is the same as or different from a previous precoding may depend on a state of the channel or other channel characteristics.

At 425, base station 105-*b* may compare the precoding to be applied to the second demodulation reference signal of a second downlink data transmission with the precoding applied to the first demodulation reference signal of the first downlink data transmission.

At 430, base station 105-*b* may optionally toggle a bit value of the second NBI from a bit value of the first NBI (e.g., from 1 to 0 or from 0 to 1) when a different precoding is applied to the second demodulation reference signal of a second downlink data transmission as the precoding applied to the first demodulation reference signal of the first downlink data transmission. In cases where the precoding is the same between first and second downlink data transmissions, the DCI bit of the NBI may not be toggled.

At 435, base station 105-*b* may transmit, to UE 115-*b*, an NBI (e.g., via DCI) associated with a second demodulation reference signal of a second downlink data transmission. In some cases, the NBI may include a bit of DCI that indicates the precoding of the second demodulation reference signal of the second downlink data transmission in relation to a previous precoding of the previous data transmission (e.g., previous PDSCH such as the data transmission transmitted at 410).

At 440, base station 105-*b* may transmit, to UE 115-*b*, a data transmission (e.g., a PDSCH), which may be precoded according to the NBI transmitted at 435. The bundling indicator may be transmitted in the same transmission as the second data transmission (e.g., as part of control signaling associated with the data transmission).

At 445, UE 115-*b* may compare the NBI received at 405 and the NBI received at 435 to determine if the indicator has been toggled.

At 450, UE 115-*b* may determine a precoding to be applied to the second demodulation reference signal based at least in part on a comparison of the first NBI and the second NBI at 445. For example, if the indicator is not toggled, then the same precoder may be applied as the previous data transmission associated with the first NBI. In another example, if the indicator is toggled, then a different precoder may be applied with respect to the previous data transmission associated with the first NBI.

At 455, UE 115-*b* may optionally bundle (e.g., apply the same precoder) the second demodulation reference signal of a second downlink data transmission with the first demodulation reference signal of a first downlink data transmission based at least in part on the first NBI and the second NBI being the same. In some cases, the same precoding is applied to a subset of physical resource blocks of the second demodulation reference signal and a subset of physical resource blocks of the first demodulation reference signal based at least in part on an overlap of resources for the first downlink data transmission and the second downlink data transmission.

Figure 5:
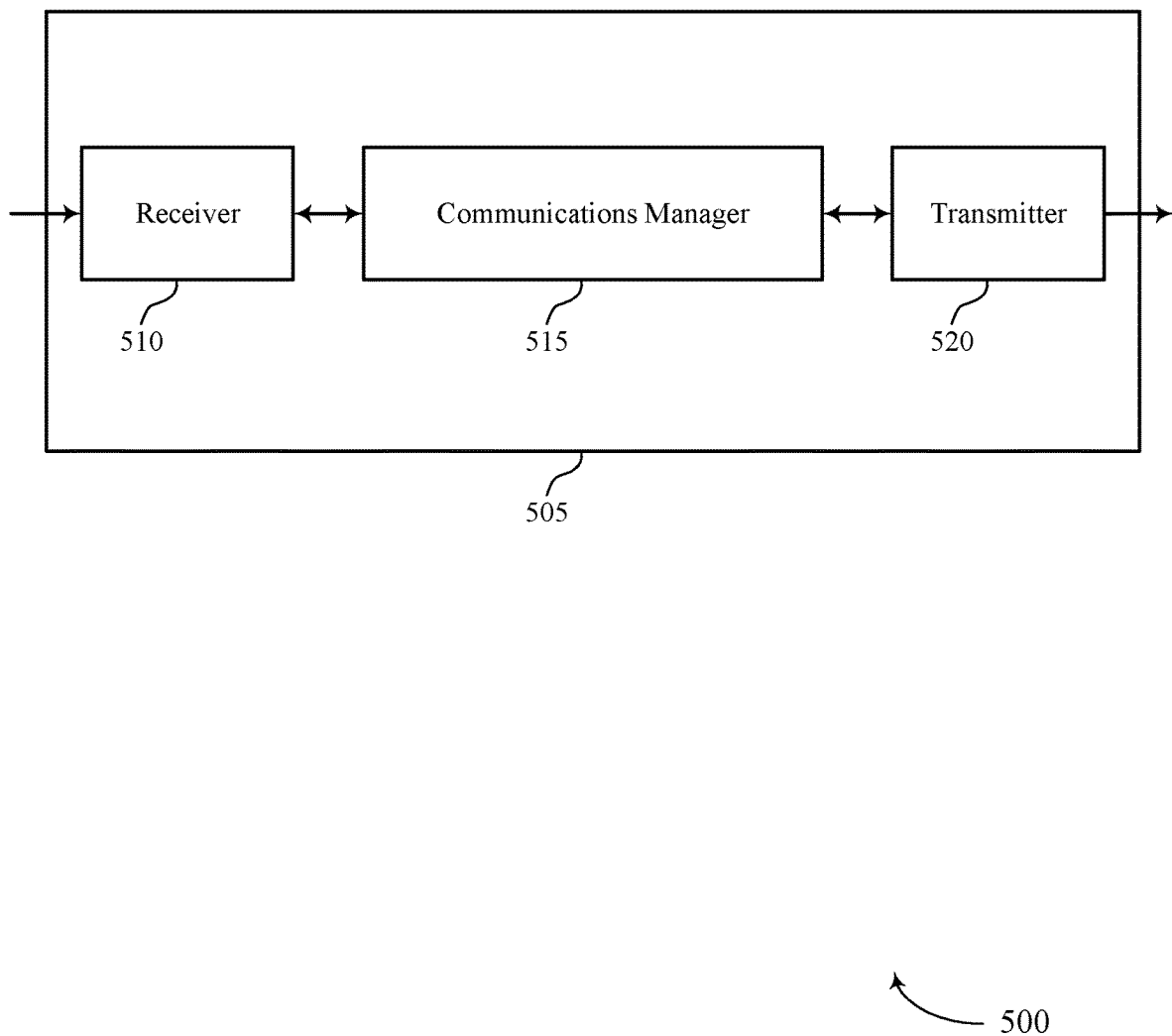
FIGS. 5 and 6 show block diagrams of devices that support triggering demodulation reference signal bundling in accordance with aspects of the present disclosure.

FIG. 5 shows a block diagram 500 of a device 505 that supports triggering demodulation reference signal bundling in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to triggering demodulation reference signal bundling, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may identify a first bundling indicator associated with a first demodulation reference signal of a first downlink data transmission, receive control signaling indicating a second bundling indicator associated with a second demodulation reference signal of a second downlink data transmission subsequent to the first downlink data transmission, and determine a precoding to be applied to the second demodulation reference signal based on a comparison of the first bundling indicator and the second bundling indicator. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
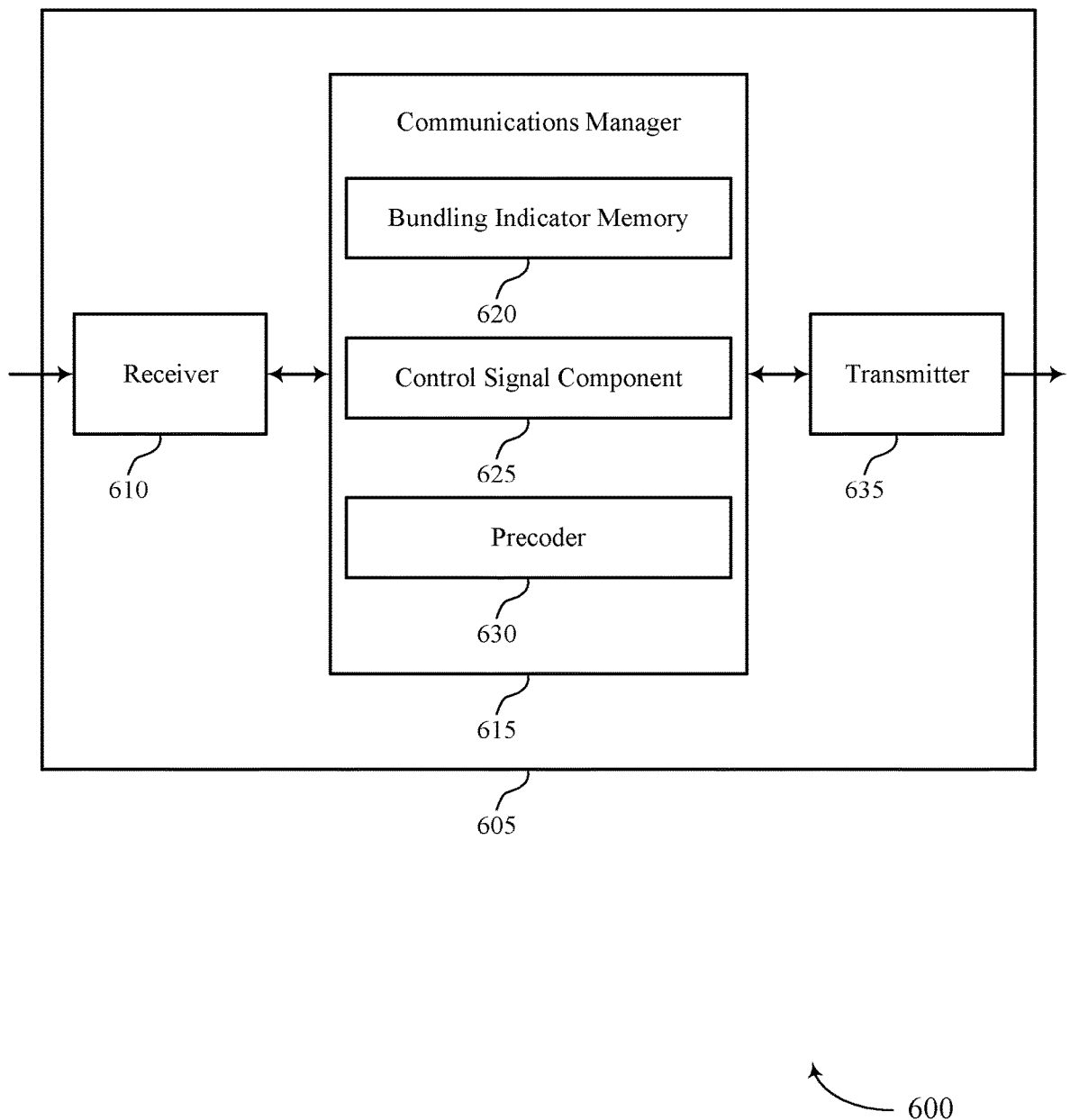

FIG. 6 shows a block diagram 600 of a device 605 that supports triggering demodulation reference signal bundling in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to triggering demodulation reference signal bundling, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a bundling indicator memory 620, a control signal component 625, and a precoder 630. The communications manager 615 may be an example of aspects of the communications manager 810 described herein. The actions performed by the communications manager 615 as described herein may be implemented to realize one or more potential advantages. One implementation may allow a UE 115 to reduce computational complexity and lower signaling or information overhead for DMRS bundling by avoiding having to provide detailed bundling information, and instead can provide an indication with respect to a previously precoding (e.g., in the form of a single bit being toggled).

The bundling indicator memory 620 may identify a first bundling indicator associated with a first demodulation reference signal of a first downlink data transmission.

The control signal component 625 may receive control signaling indicating a second bundling indicator associated with a second demodulation reference signal of a second downlink data transmission subsequent to the first downlink data transmission.

The precoder 630 may determine a precoding to be applied to the second demodulation reference signal based on a comparison of the first bundling indicator and the second bundling indicator.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
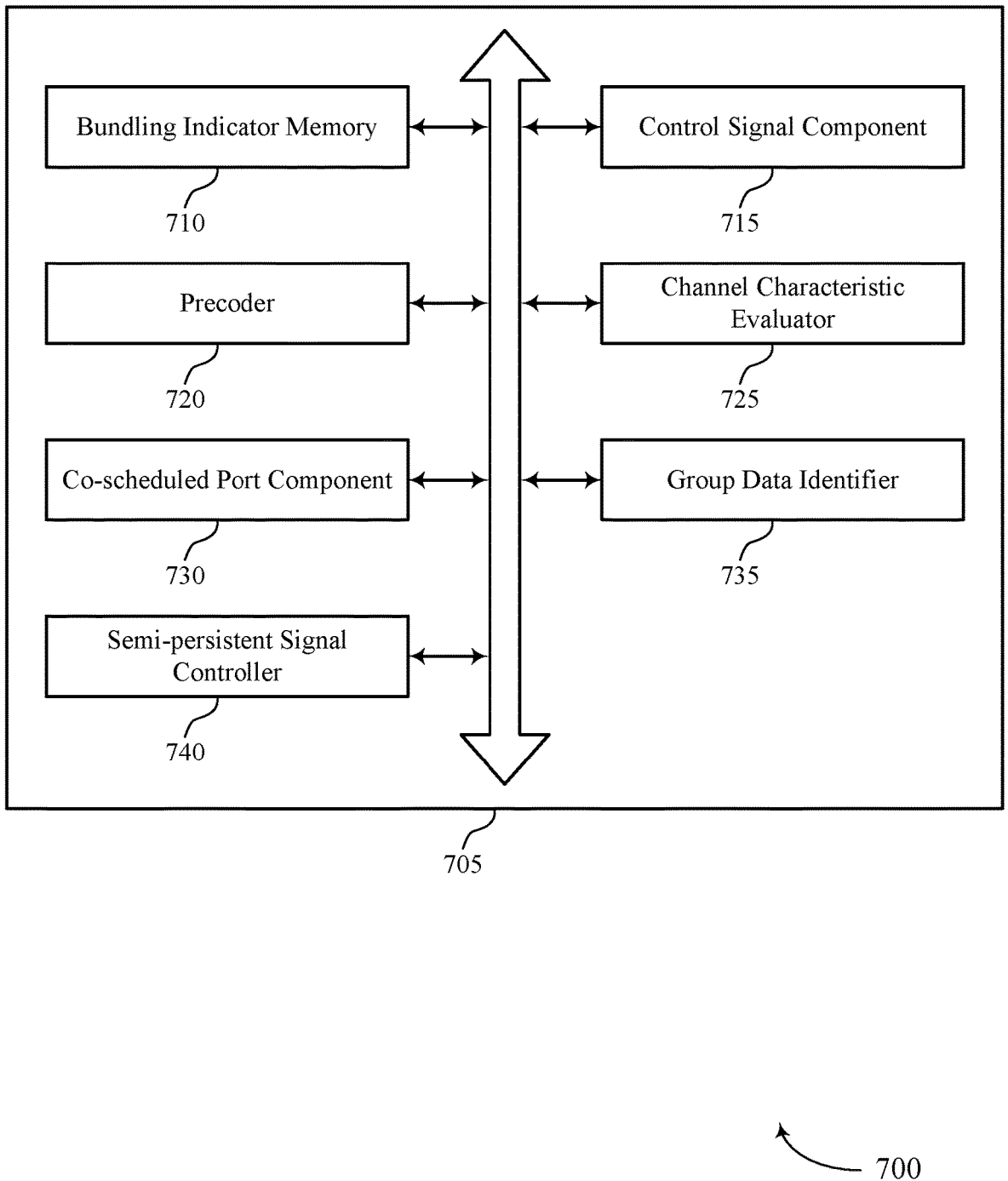
FIG. 7 shows a block diagram of a communications manager that supports triggering demodulation reference signal bundling in accordance with aspects of the present disclosure.

FIG. 7 shows a block diagram 700 of a communications manager 705 that supports triggering demodulation reference signal bundling in accordance with aspects of the present disclosure. The communications manager 705 may be an example of aspects of a communications manager 515, a communications manager 615, or a communications manager 810 described herein. The communications manager 705 may include a bundling indicator memory 710, a control signal component 715, a precoder 720, a channel characteristic evaluator 725, a co-scheduled port component 730, a group data identifier 735, and a semi-persistent signal controller 740. Each of these modules may communicate, directly or indirectly, with one another (e.g., via one or more buses).

The bundling indicator memory 710 may identify a first bundling indicator associated with a first demodulation reference signal of a first downlink data transmission. In some cases, the second bundling indicator being different than the first bundling indicator includes a bit value of the second bundling indicator being toggled from a bit value of the first bundling indicator.

The control signal component 715 may receive control signaling indicating a second bundling indicator associated with a second demodulation reference signal of a second downlink data transmission subsequent to the first downlink data transmission. In some cases, the control signaling includes DCI. In some cases, a bitfield of the DCI indicates both demodulation reference signal port indices and the second bundling indicator associated with the demodulation reference signal.

The precoder 720 may determine a precoding to be applied to the second demodulation reference signal based on a comparison of the first bundling indicator and the second bundling indicator. In some examples, the precoder 720 may determine a same precoding for the second demodulation reference signal as the precoding applied to the first demodulation reference signal based on the first bundling indicator and the second bundling indicator being the same. In some examples, the precoder 720 may determine a same precoding for the second demodulation reference signal as the precoding applied to the first demodulation reference signal based on the evaluation of the channel transmission property of the first downlink data transmission and the channel transmission property of the second downlink data transmission. In some examples, the precoder 720 may determine the same precoding for the fourth demodulation reference signal as the precoding applied to the third demodulation reference signal based on the first bundling indicator and the second bundling indicator being the same.

In some examples, the precoder 720 may determine a different precoding for the fourth demodulation reference signal as the precoding applied to the third demodulation reference signal based on the first bundling indicator and the second bundling indicator being the same. In some examples, the precoder 720 may determine a precoding to be applied to the fourth demodulation reference signal with respect to a precoding applied to the third demodulation reference signal based on a comparison of the first co-scheduled port bundling indicator and the second co-scheduled port bundling indicator. In some examples, the precoder 720 may determine a different precoding for the second demodulation reference signal as the precoding applied to the first demodulation reference signal based on the second bundling indicator being different than the first bundling indicator.

In some cases, the same precoding is applied to a subset of physical resource blocks of the second demodulation reference signal and a subset of physical resource blocks of the first demodulation reference signal based on an overlap of resources for the first downlink data transmission and the second downlink data transmission. In some cases, the determining the same precoding for the second demodulation reference signal as the precoding applied to the first demodulation reference signal is based on the channel transmission property of the first downlink data transmission and the second downlink data transmission being the same.

The channel characteristic evaluator 725 may evaluate a channel transmission property of the first downlink data transmission and the second downlink data transmission based on the first bundling indicator and the second bundling indicator being the same.

In some cases, the channel transmission property includes a port identifier, a channel type, a demodulation reference signal pattern, a demodulation reference signal type, a virtual frequency resource allocation, a physical frequency resource allocation, or a combination thereof. In some cases, the channel type includes a physical downlink shared channel type. In some cases, the channel transmission property includes a time unit threshold, and the determining the same precoding for the second demodulation reference signal as the precoding applied to the first demodulation reference signal is based on the second demodulation reference signal being within a time period less than the time unit threshold from the first demodulation reference signal.

The co-scheduled port component 730 may receive a third demodulation reference signal, associated with a first downlink channel for a second UE, that is co-scheduled on a same time-frequency resource and different antenna port as the first demodulation reference signal associated with the first downlink data transmission of the first downlink channel.

In some examples, the co-scheduled port component 730 may receive a fourth demodulation reference signal, associated with a second downlink channel for the second UE, that is co-scheduled on a same time-frequency resource and different antenna port as the second demodulation reference signal associated with the second downlink data transmission of the second downlink channel.

In some examples, the co-scheduled port component 730 may identify a first co-scheduled port bundling indicator associated with the third demodulation reference signal. In some examples, the co-scheduled port component 730 may receive a second co-scheduled port bundling indicator associated with the fourth demodulation reference signal in the control signaling.

The group data identifier 735 may receive a group identifier for the fourth demodulation reference signal that indicates data is absent in the second downlink channel for the second UE and was absent in the first downlink channel for the second UE, and where determining the same precoding for the fourth demodulation reference signal as the precoding applied to the third demodulation reference signal is based on the reception of the group identifier.

The semi-persistent signal controller 740 may determine a same precoding for each semi-persistent scheduled demodulation reference signal of the set of semi-persistent scheduled demodulation reference signals based on the second bundling indicator.

In some examples, the semi-persistent signal controller 740 may determine a different precoding for each semi-persistent scheduled demodulation reference signal of the set of semi-persistent scheduled demodulation reference signals based on the second bundling indicator.

Based on configuring the NBI to provide information with reference to a previous NBI, which allows for reduced information that may need to be transmitted to a UE for bundling indication purpose, a processor of a UE 115 (e.g., controlling the receiver 710, the transmitter 740, or the transceiver 920 as described with reference to FIG. 9) may efficiently determine that the DMRS of subsequent PDSCHs should or should not be bundled. As such, when the NBI is received, the processor may be ready to bundle DMRS more efficiently through the reduction of bundling considerations.

Figure 8:
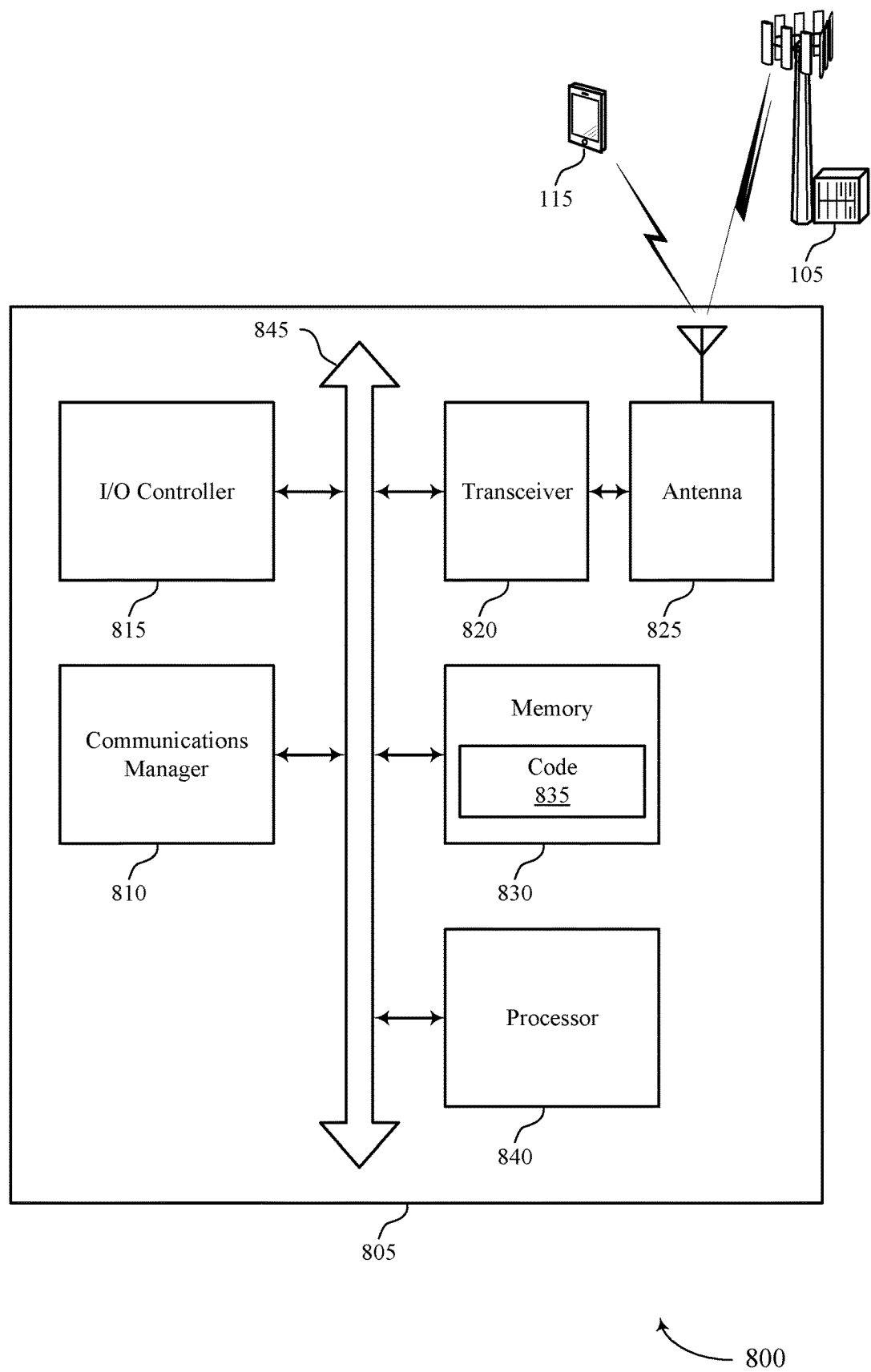
FIG. 8 shows a diagram of a system including a device that supports triggering demodulation reference signal bundling in accordance with aspects of the present disclosure.

FIG. 8 shows a diagram of a system 800 including a device 805 that supports triggering demodulation reference signal bundling in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may identify a first bundling indicator associated with a first demodulation reference signal of a first downlink data transmission, receive control signaling indicating a second bundling indicator associated with a second demodulation reference signal of a second downlink data transmission subsequent to the first downlink data transmission, and determine a precoding to be applied to the second demodulation reference signal based on a comparison of the first bundling indicator and the second bundling indicator.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting triggering demodulation reference signal bundling).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
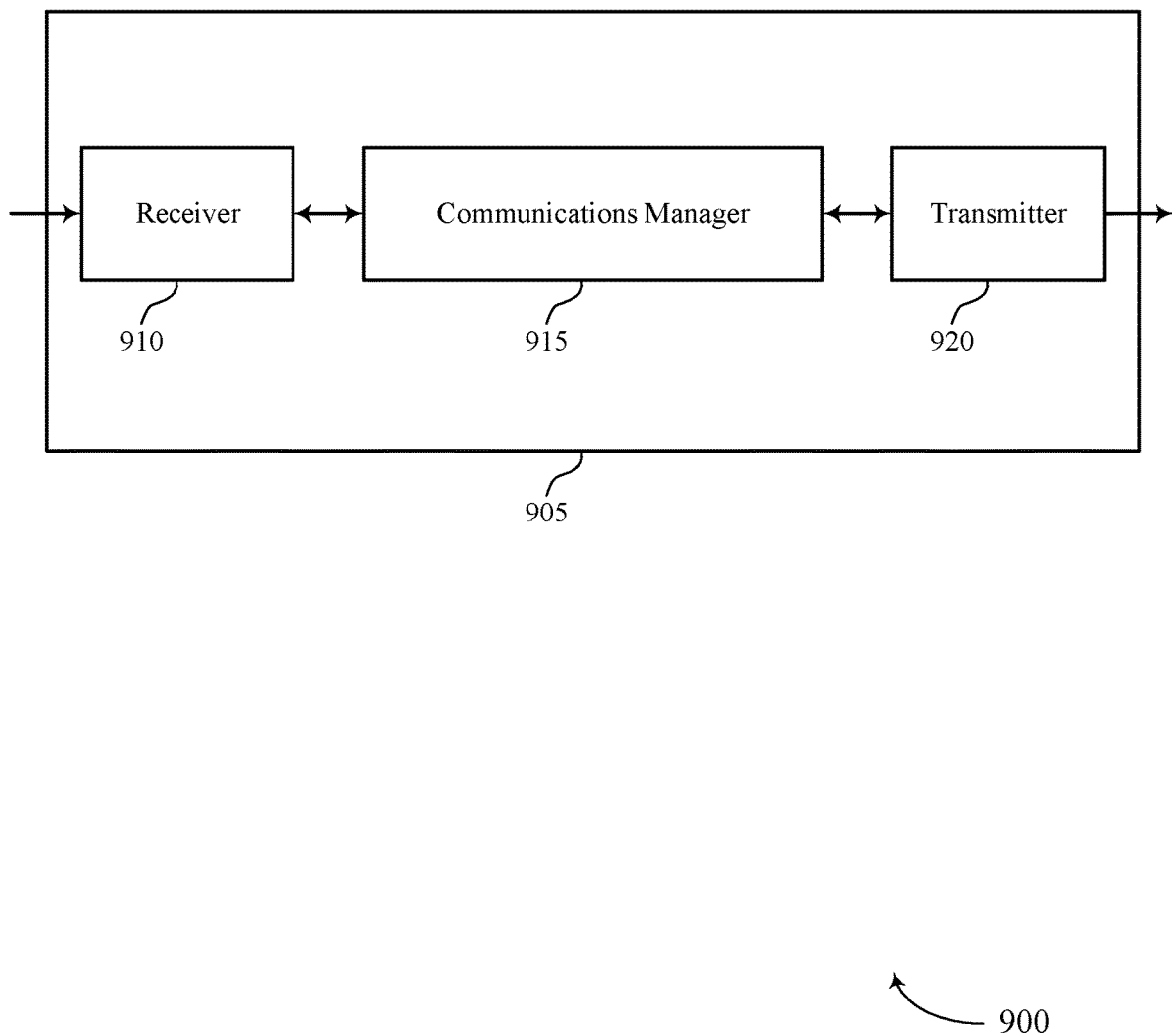
FIGS. 9 and 10 show block diagrams of devices that support triggering demodulation reference signal bundling in accordance with aspects of the present disclosure.

FIG. 9 shows a block diagram 900 of a device 905 that supports triggering demodulation reference signal bundling in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to triggering demodulation reference signal bundling, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit a first bundling indicator associated with a first demodulation reference signal of a first downlink data transmission, determine a precoding to be applied to a second demodulation reference signal of a second downlink data transmission, subsequent to the first downlink data transmission, and transmit control signaling indicating a second bundling indicator associated with the second demodulation reference signal based on a comparison of the precoding to be applied to the second demodulation reference signal with the precoding applied to the first demodulation reference signal. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
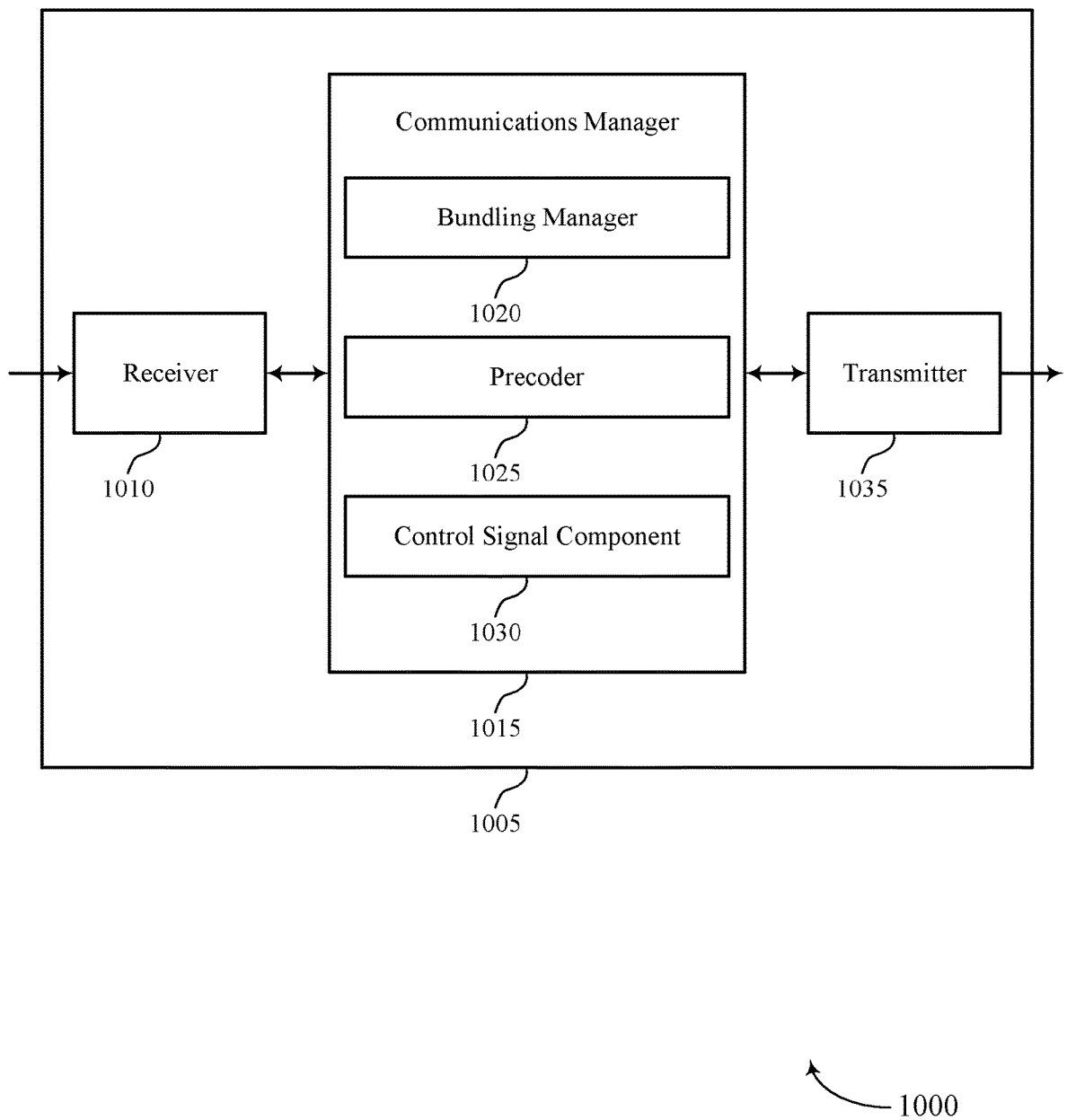

FIG. 10 shows a block diagram 1000 of a device 1005 that supports triggering demodulation reference signal bundling in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to triggering demodulation reference signal bundling, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a bundling manager 1020, a precoder 1025, and a control signal component 1030. The communications manager 1015 may be an example of aspects of the communications manager 1210 described herein.

The bundling manager 1020 may transmit a first bundling indicator associated with a first demodulation reference signal of a first downlink data transmission.

The precoder 1025 may determine a precoding to be applied to a second demodulation reference signal of a second downlink data transmission, subsequent to the first downlink data transmission.

The control signal component 1030 may transmit control signaling indicating a second bundling indicator associated with the second demodulation reference signal based on a comparison of the precoding to be applied to the second demodulation reference signal with the precoding applied to the first demodulation reference signal.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
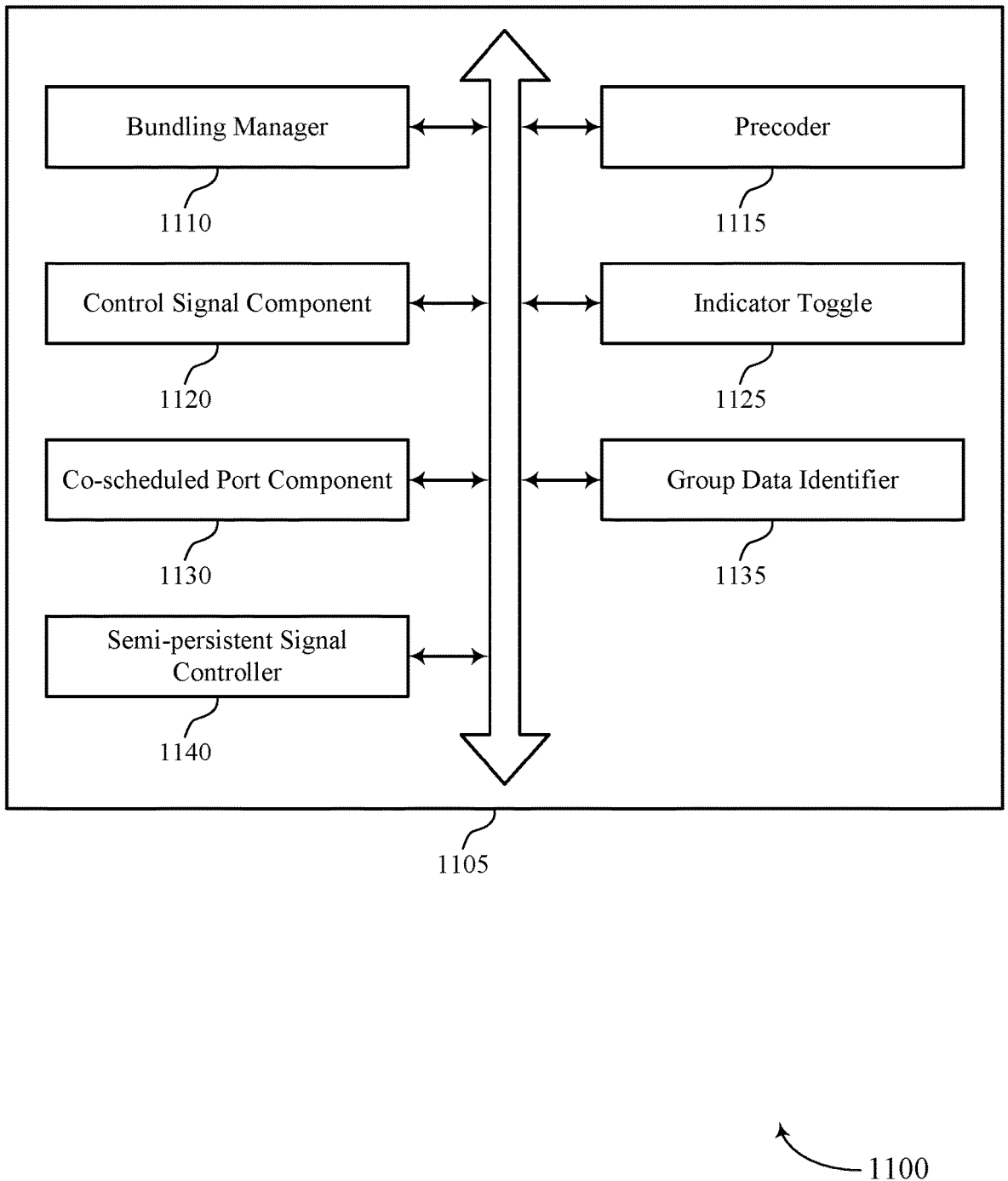
FIG. 11 shows a block diagram of a communications manager that supports triggering demodulation reference signal bundling in accordance with aspects of the present disclosure.

FIG. 11 shows a block diagram 1100 of a communications manager 1105 that supports triggering demodulation reference signal bundling in accordance with aspects of the present disclosure. The communications manager 1105 may be an example of aspects of a communications manager 915, a communications manager 1015, or a communications manager 1210 described herein. The communications manager 1105 may include a bundling manager 1110, a precoder 1115, a control signal component 1120, an indicator toggle 1125, a co-scheduled port component 1130, a group data identifier 1135, and a semi-persistent signal controller 1140. Each of these modules may communicate, directly or indirectly, with one another (e.g., via one or more buses).

The bundling manager 1110 may transmit a first bundling indicator associated with a first demodulation reference signal of a first downlink data transmission.

The precoder 1115 may determine a precoding to be applied to a second demodulation reference signal of a second downlink data transmission, subsequent to the first downlink data transmission. In some examples, the precoder 1115 may apply a same precoding to the second demodulation reference signal as the precoding applied to the first demodulation reference signal, where the first bundling indicator is the same as the second bundling indicator. In some examples, the precoder 1115 may apply a different precoding to the second demodulation reference signal as the precoding applied to the first demodulation reference signal.

In some examples, the precoder 1115 may apply a same precoding to the fourth demodulation reference signal as the precoding applied to the third demodulation reference signal, where the first bundling indicator is the same as the second bundling indicator. In some examples, the precoder 1115 may apply a different precoding to the fourth demodulation reference signal as the precoding applied to the third demodulation reference signal, where the first bundling indicator is the same as the second bundling indicator. In some examples, the precoder 1115 may determine a precoding to be applied to the fourth demodulation reference signal with respect to a precoding applied to the third demodulation reference signal. In some examples, the precoder 1115 may apply a same precoding to each semi-persistent scheduled demodulation reference signal of the set of semi-persistent scheduled demodulation reference signals. In some examples, the precoder 1115 may apply a different precoding to each semi-persistent scheduled demodulation reference signal of the set of semi-persistent scheduled demodulation reference signals.

In some cases, the same precoding is applied to a subset of the second demodulation reference signal and a subset of the first demodulation reference signal based on an overlap of resources for the first downlink data transmission and the second downlink data transmission. In some cases, the second bundling indicator being the same as the first bundling indicator includes a bit value of the second bundling indicator is the same as a bit value of the first bundling indicator.

The control signal component 1120 may transmit control signaling indicating a second bundling indicator associated with the second demodulation reference signal based on a comparison of the precoding to be applied to the second demodulation reference signal with the precoding applied to the first demodulation reference signal.

In some cases, the control signaling includes DCI. In some cases, a bitfield of the DCI indicates both demodulation reference signal port indices and the second bundling indicator associated with the demodulation reference signal.

The indicator toggle 1125 may toggle a bit value of the second bundling indicator from a bit value of the first bundling indicator.

The co-scheduled port component 1130 may transmit a third demodulation reference signal, associated with a first downlink channel of a second UE, that is co-scheduled on a same time-frequency resource and different antenna port as the first demodulation reference signal associated with the first downlink data transmission of the first downlink channel.

In some examples, the co-scheduled port component 1130 may transmit a fourth demodulation reference signal, associated with a second downlink channel of a second UE, that is co-scheduled on a same time-frequency resource and different antenna port as the second demodulation reference signal associated with the second downlink data transmission of the second downlink channel.

In some examples, the co-scheduled port component 1130 may identify a first co-scheduled port bundling indicator associated with the third demodulation reference signal. In some examples, the co-scheduled port component 1130 may transmit a second co-scheduled port bundling indicator associated with the fourth demodulation reference signal in the control signaling based on the first co-scheduled port bundling indicator.

The group data identifier 1135 may transmit a group identifier for the fourth demodulation reference signal that indicates data is absent in the second downlink channel for the second UE and was absent in the first downlink channel for the second UE.

The semi-persistent signal controller 1140 may transmit the second bundling indicator based on the application of the same precoding to each semi-persistent scheduled demodulation reference signal. In some examples, the semi-persistent signal controller 1140 may transmit the second bundling indicator based on the application of the different precoding to each semi-persistent scheduled demodulation reference signal.

Figure 12:
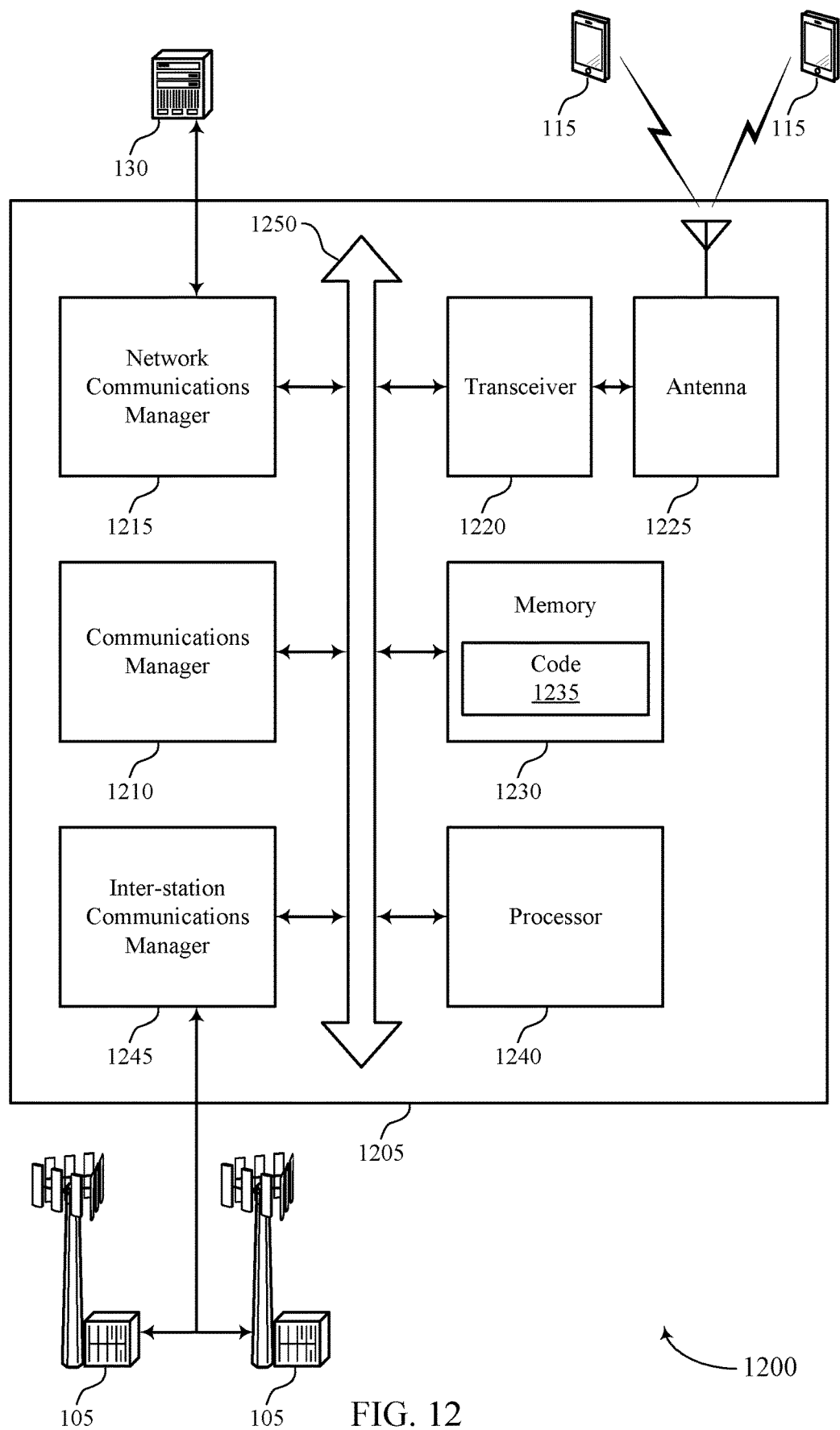
FIG. 12 shows a diagram of a system including a device that supports triggering demodulation reference signal bundling in accordance with aspects of the present disclosure.

FIG. 12 shows a diagram of a system 1200 including a device 1205 that supports triggering demodulation reference signal bundling in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit a first bundling indicator associated with a first demodulation reference signal of a first downlink data transmission, determine a precoding to be applied to a second demodulation reference signal of a second downlink data transmission, subsequent to the first downlink data transmission, and transmit control signaling indicating a second bundling indicator associated with the second demodulation reference signal based on a comparison of the precoding to be applied to the second demodulation reference signal with the precoding applied to the first demodulation reference signal.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting triggering demodulation reference signal bundling).

The inter-station communications manager 1245 may manage communications with other base station 105 and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
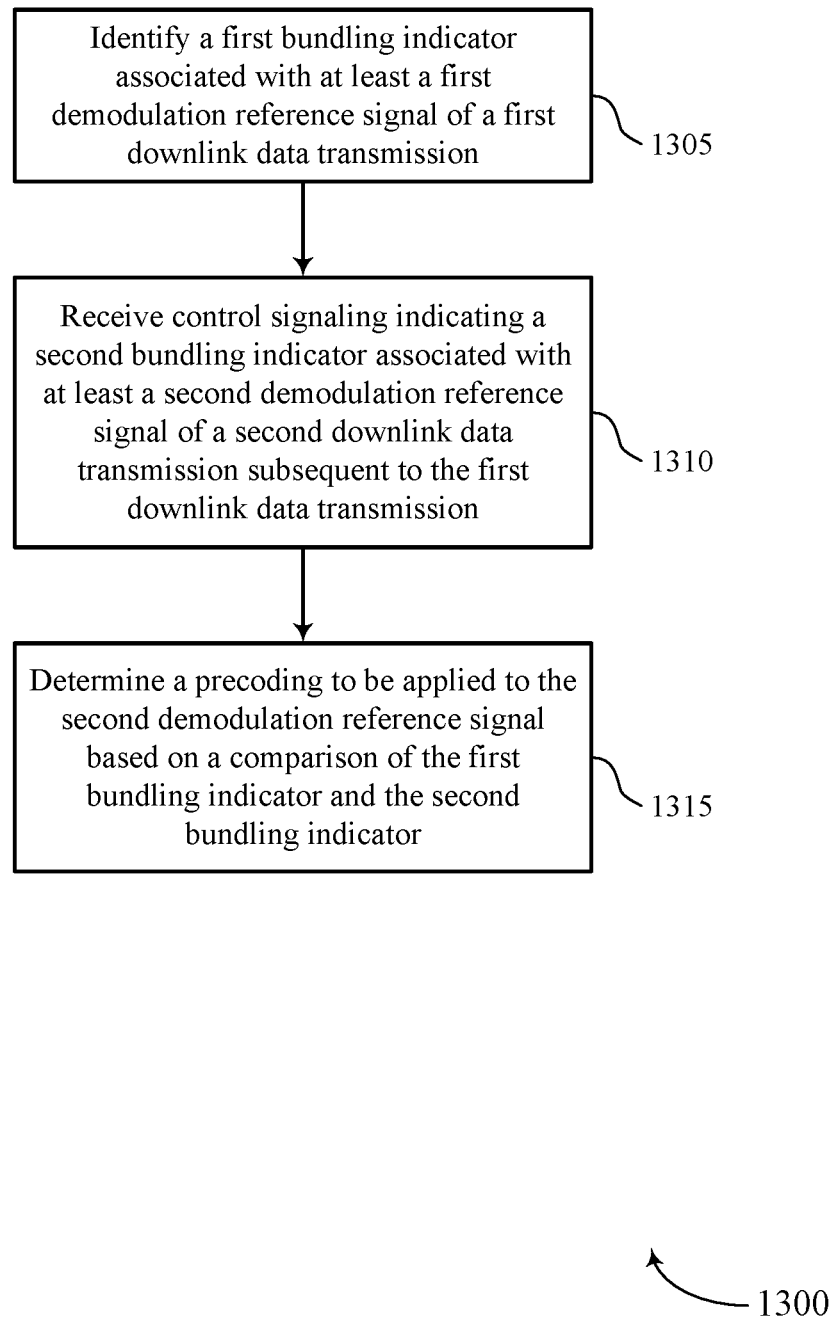
FIGS. 13 through 19 show flowcharts illustrating methods that support triggering demodulation reference signal bundling in accordance with aspects of the present disclosure.

FIG. 13 shows a flowchart illustrating a method 1300 that supports triggering demodulation reference signal bundling in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1305, the UE may identify a first bundling indicator associated with a first demodulation reference signal of a first downlink data transmission. In some cases, identifying may include receiving a first bundling indicator associated with at least a first demodulation reference signal of a first downlink data transmission. The operations of 1305 may be performed according to the methods described herein. In some examples, aspects of the operations of 1305 may be performed by a bundling indicator memory as described with reference to FIGS. 5 through 8.

At 1310, the UE may receive control signaling indicating a second bundling indicator associated with at least a second demodulation reference signal of a second downlink data transmission subsequent to the first downlink data transmission. The operations of 1310 may be performed according to the methods described herein. In some examples, aspects of the operations of 1310 may be performed by a control signal component as described with reference to FIGS. 5 through 8.

At 1315, the UE may determine a precoding to be applied to the second demodulation reference signal based on a comparison of the first bundling indicator and the second bundling indicator. The operations of 1315 may be performed according to the methods described herein. In some examples, aspects of the operations of 1315 may be performed by a precoder as described with reference to FIGS. 5 through 8.

Figure 14:
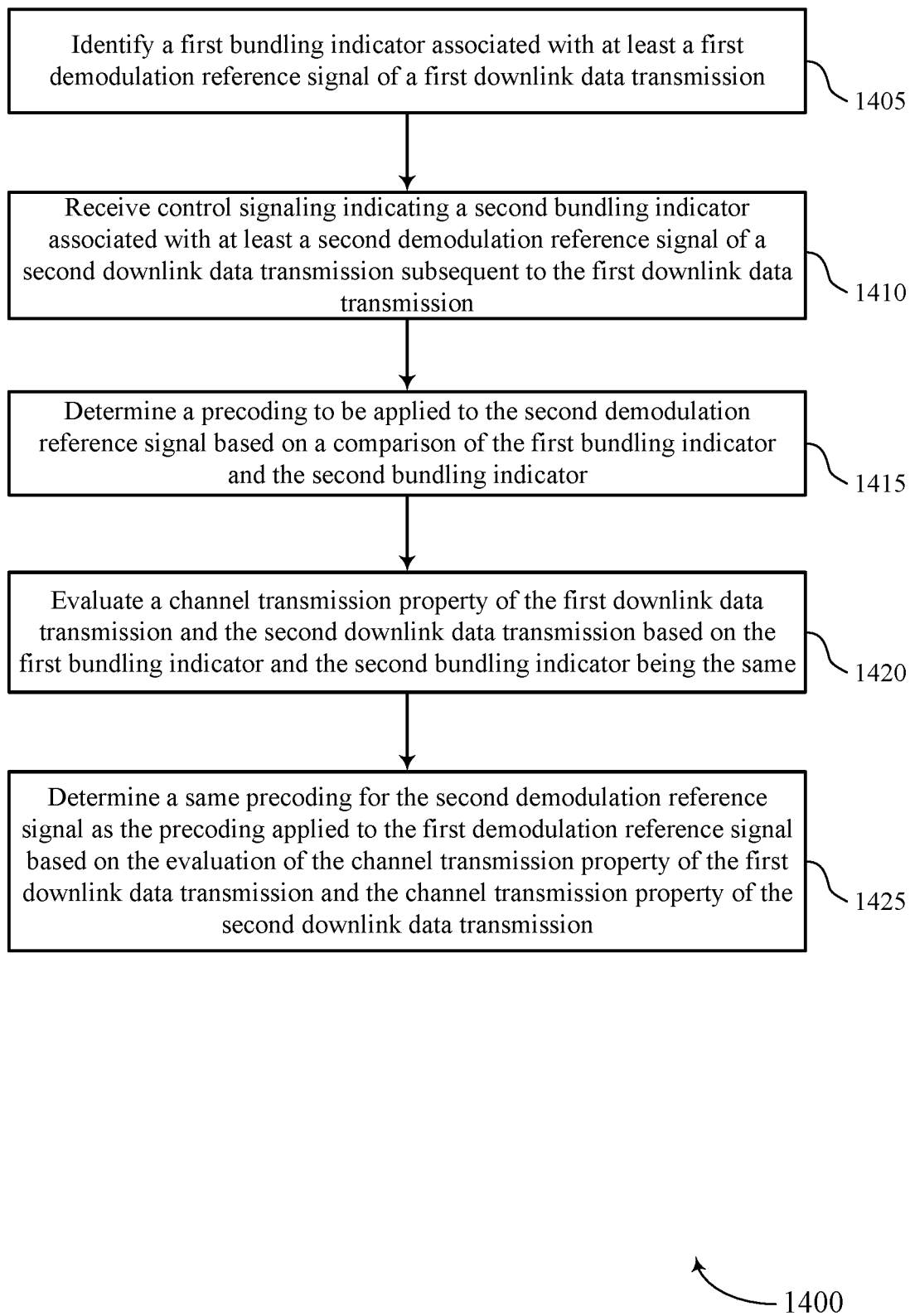

FIG. 14 shows a flowchart illustrating a method 1400 that supports triggering demodulation reference signal bundling in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1405, the UE may identify a first bundling indicator associated with at least a first demodulation reference signal of a first downlink data transmission. In some cases, identifying may include receiving a first bundling indicator associated with a first demodulation reference signal of a first downlink data transmission. The operations of 1405 may be performed according to the methods described herein. In some examples, aspects of the operations of 1405 may be performed by a bundling indicator memory as described with reference to FIGS. 5 through 8.

At 1410, the UE may receive control signaling indicating a second bundling indicator associated with at least a second demodulation reference signal of a second downlink data transmission subsequent to the first downlink data transmission. The operations of 1410 may be performed according to the methods described herein. In some examples, aspects of the operations of 1410 may be performed by a control signal component as described with reference to FIGS. 5 through 8.

At 1415, the UE may determine a precoding to be applied to the second demodulation reference signal based on a comparison of the first bundling indicator and the second bundling indicator. The operations of 1415 may be performed according to the methods described herein. In some examples, aspects of the operations of 1415 may be performed by a precoder as described with reference to FIGS. 5 through 8.

At 1420, the UE may evaluate a channel transmission property of the first downlink data transmission and the second downlink data transmission based on the first bundling indicator and the second bundling indicator being the same. The operations of 1420 may be performed according to the methods described herein. In some examples, aspects of the operations of 1420 may be performed by a channel characteristic evaluator as described with reference to FIGS. 5 through 8.

At 1425, the UE may determine a same precoding for the second demodulation reference signal as the precoding applied to the first demodulation reference signal based on the evaluation of the channel transmission property of the first downlink data transmission and the channel transmission property of the second downlink data transmission. The operations of 1425 may be performed according to the methods described herein. In some examples, aspects of the operations of 1425 may be performed by a precoder as described with reference to FIGS. 5 through 8.

Figure 15:
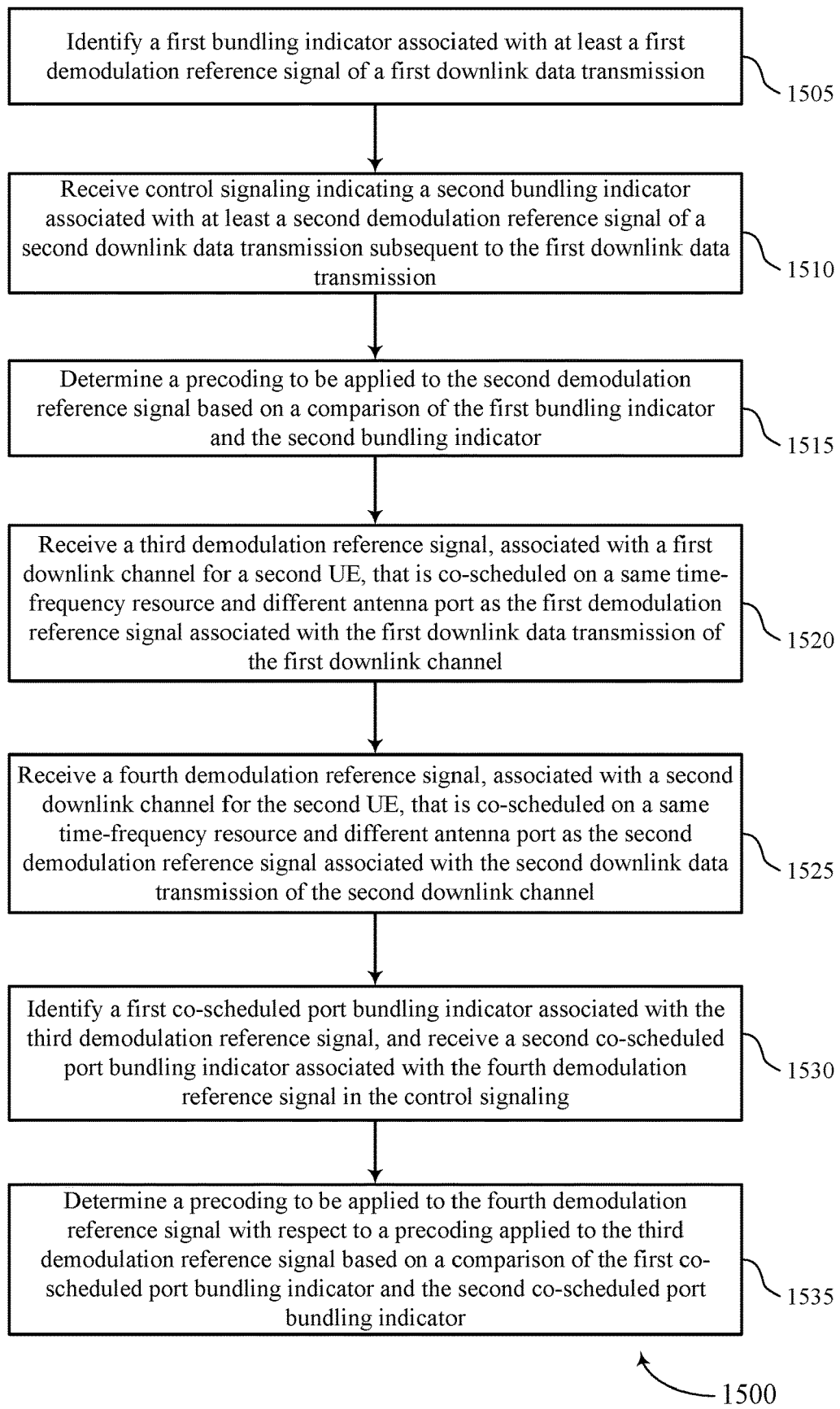

FIG. 15 shows a flowchart illustrating a method 1500 that supports triggering demodulation reference signal bundling in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1505, the UE may identify a first bundling indicator associated with at least a first demodulation reference signal of a first downlink data transmission. In some cases, identifying may include receiving a first bundling indicator associated with a first demodulation reference signal of a first downlink data transmission. The operations of 1505 may be performed according to the methods described herein. In some examples, aspects of the operations of 1505 may be performed by a bundling indicator memory as described with reference to FIGS. 5 through 8.

At 1510, the UE may receive control signaling indicating a second bundling indicator associated with at least a second demodulation reference signal of a second downlink data transmission subsequent to the first downlink data transmission. The operations of 1510 may be performed according to the methods described herein. In some examples, aspects of the operations of 1510 may be performed by a control signal component as described with reference to FIGS. 5 through 8.

At 1515, the UE may determine a precoding to be applied to the second demodulation reference signal based on a comparison of the first bundling indicator and the second bundling indicator. The operations of 1515 may be performed according to the methods described herein. In some examples, aspects of the operations of 1515 may be performed by a precoder as described with reference to FIGS. 5 through 8.

At 1520, the UE may receive a third demodulation reference signal, associated with a first downlink channel for a second UE, that is co-scheduled on a same time-frequency resource and different antenna port as the first demodulation reference signal associated with the first downlink data transmission of the first downlink channel. The operations of 1520 may be performed according to the methods described herein. In some examples, aspects of the operations of 1520 may be performed by a co-scheduled port component as described with reference to FIGS. 5 through 8.

At 1525, the UE may receive a fourth demodulation reference signal, associated with a second downlink channel for the second UE, that is co-scheduled on a same time-frequency resource and different antenna port as the second demodulation reference signal associated with the second downlink data transmission of the second downlink channel. The operations of 1525 may be performed according to the methods described herein. In some examples, aspects of the operations of 1525 may be performed by a co-scheduled port component as described with reference to FIGS. 5 through 8.

At 1530, the UE may identify a first co-scheduled port bundling indicator associated with the third demodulation reference signal. The operations of 1530 may be performed according to the methods described herein. In some examples, aspects of the operations of 1530 may be performed by a co-scheduled port component as described with reference to FIGS. 5 through 8.

At 1535, the UE may determine a precoding to be applied to the fourth demodulation reference signal with respect to a precoding applied to the third demodulation reference signal based on a comparison of the first co-scheduled port bundling indicator and the second co-scheduled port bundling indicator. The operations of 1535 may be performed according to the methods described herein. In some examples, aspects of the operations of 1535 may be performed by a precoder as described with reference to FIGS. 5 through 8.

Figure 16:
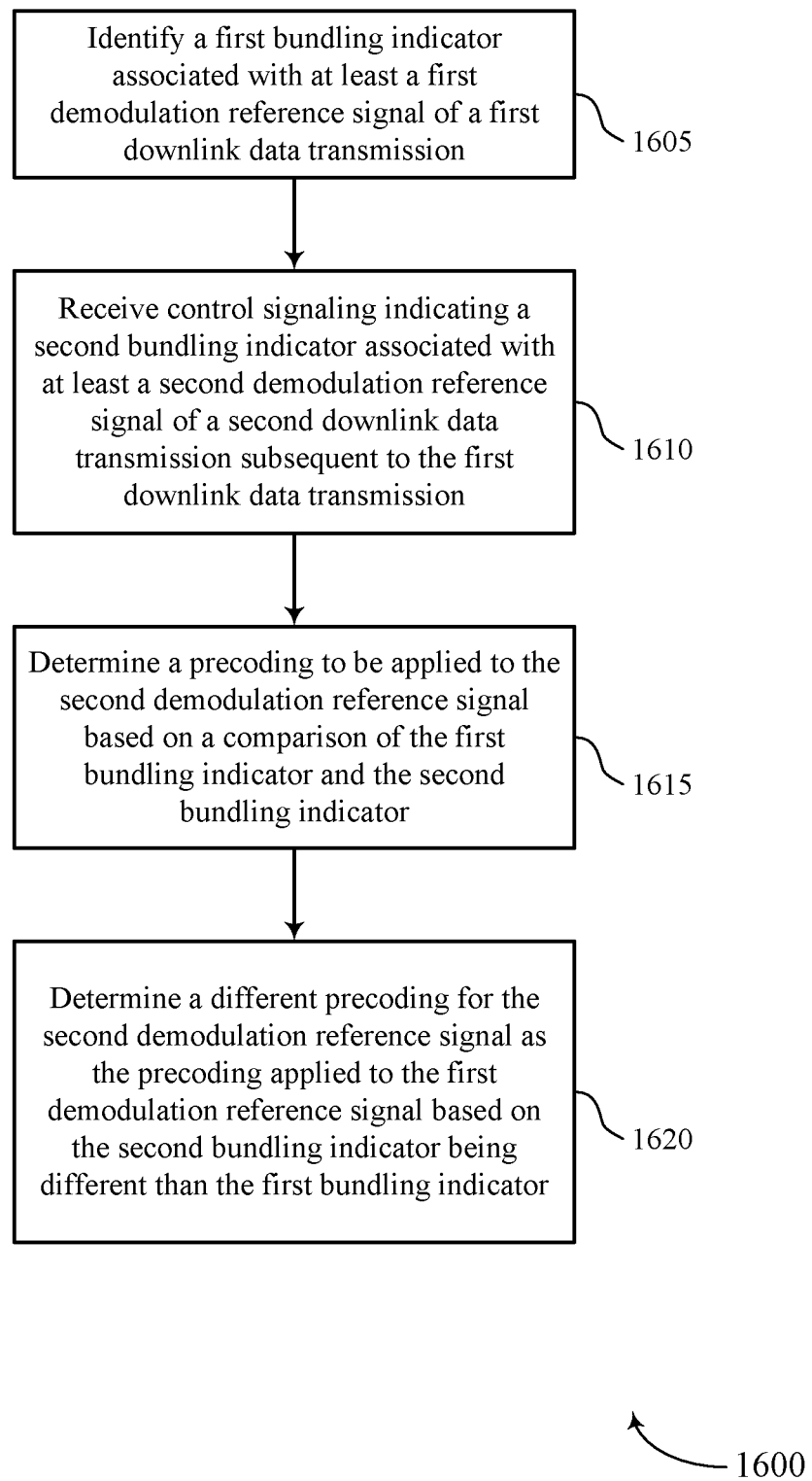

FIG. 16 shows a flowchart illustrating a method 1600 that supports triggering demodulation reference signal bundling in accordance with aspects of the present disclosure. The operations of method 1600 may be implemented by a UE 115 or its components as described herein. For example, the operations of method 1600 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1605, the UE may identify a first bundling indicator associated with at least a first demodulation reference signal of a first downlink data transmission. In some cases, identifying may include receiving a first bundling indicator associated with a first demodulation reference signal of a first downlink data transmission. The operations of 1605 may be performed according to the methods described herein. In some examples, aspects of the operations of 1605 may be performed by a bundling indicator memory as described with reference to FIGS. 5 through 8.

At 1610, the UE may receive control signaling indicating a second bundling indicator associated with at least a second demodulation reference signal of a second downlink data transmission subsequent to the first downlink data transmission. The operations of 1610 may be performed according to the methods described herein. In some examples, aspects of the operations of 1610 may be performed by a control signal component as described with reference to FIGS. 5 through 8.

At 1615, the UE may determine a precoding to be applied to the second demodulation reference signal based on a comparison of the first bundling indicator and the second bundling indicator. The operations of 1615 may be performed according to the methods described herein. In some examples, aspects of the operations of 1615 may be performed by a precoder as described with reference to FIGS. 5 through 8.

At 1620, the UE may determine a different precoding for the second demodulation reference signal as the precoding applied to the first demodulation reference signal based on the second bundling indicator being different than the first bundling indicator. The operations of 1620 may be performed according to the methods described herein. In some examples, aspects of the operations of 1620 may be performed by a precoder as described with reference to FIGS. 5 through 8.

Figure 17:
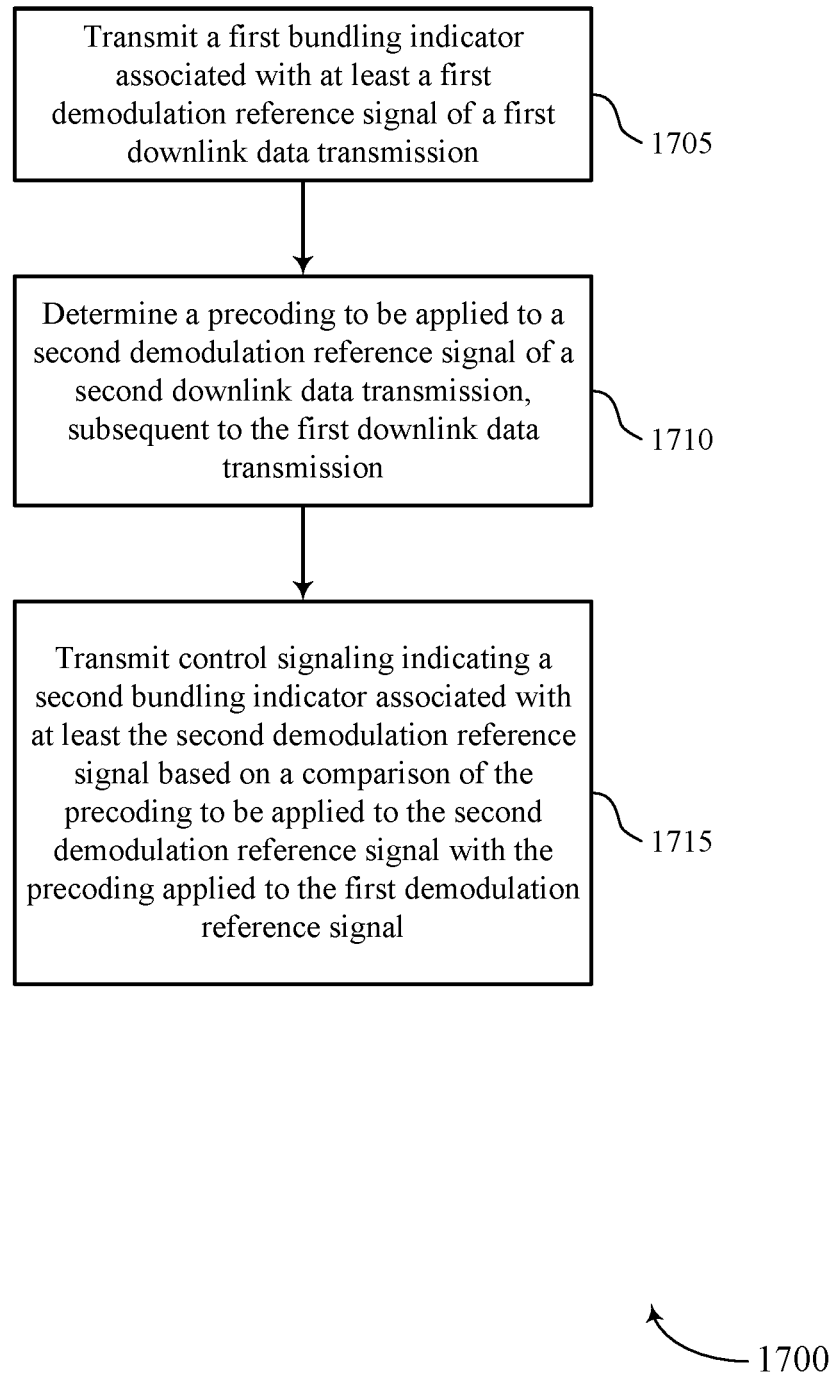

FIG. 17 shows a flowchart illustrating a method 1700 that supports triggering demodulation reference signal bundling in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1705, the base station may transmit a first bundling indicator associated with at least a first demodulation reference signal of a first downlink data transmission. The operations of 1705 may be performed according to the methods described herein. In some examples, aspects of the operations of 1705 may be performed by a bundling manager as described with reference to FIGS. 9 through 12.

At 1710, the base station may determine a precoding to be applied to a second demodulation reference signal of a second downlink data transmission, subsequent to the first downlink data transmission. The operations of 1710 may be performed according to the methods described herein. In some examples, aspects of the operations of 1710 may be performed by a precoder as described with reference to FIGS. 9 through 12.

At 1715, the base station may transmit control signaling indicating a second bundling indicator associated with at least the second demodulation reference signal based on a comparison of the precoding to be applied to the second demodulation reference signal with the precoding applied to the first demodulation reference signal. The operations of 1715 may be performed according to the methods described herein. In some examples, aspects of the operations of 1715 may be performed by a control signal component as described with reference to FIGS. 9 through 12.

Figure 18:
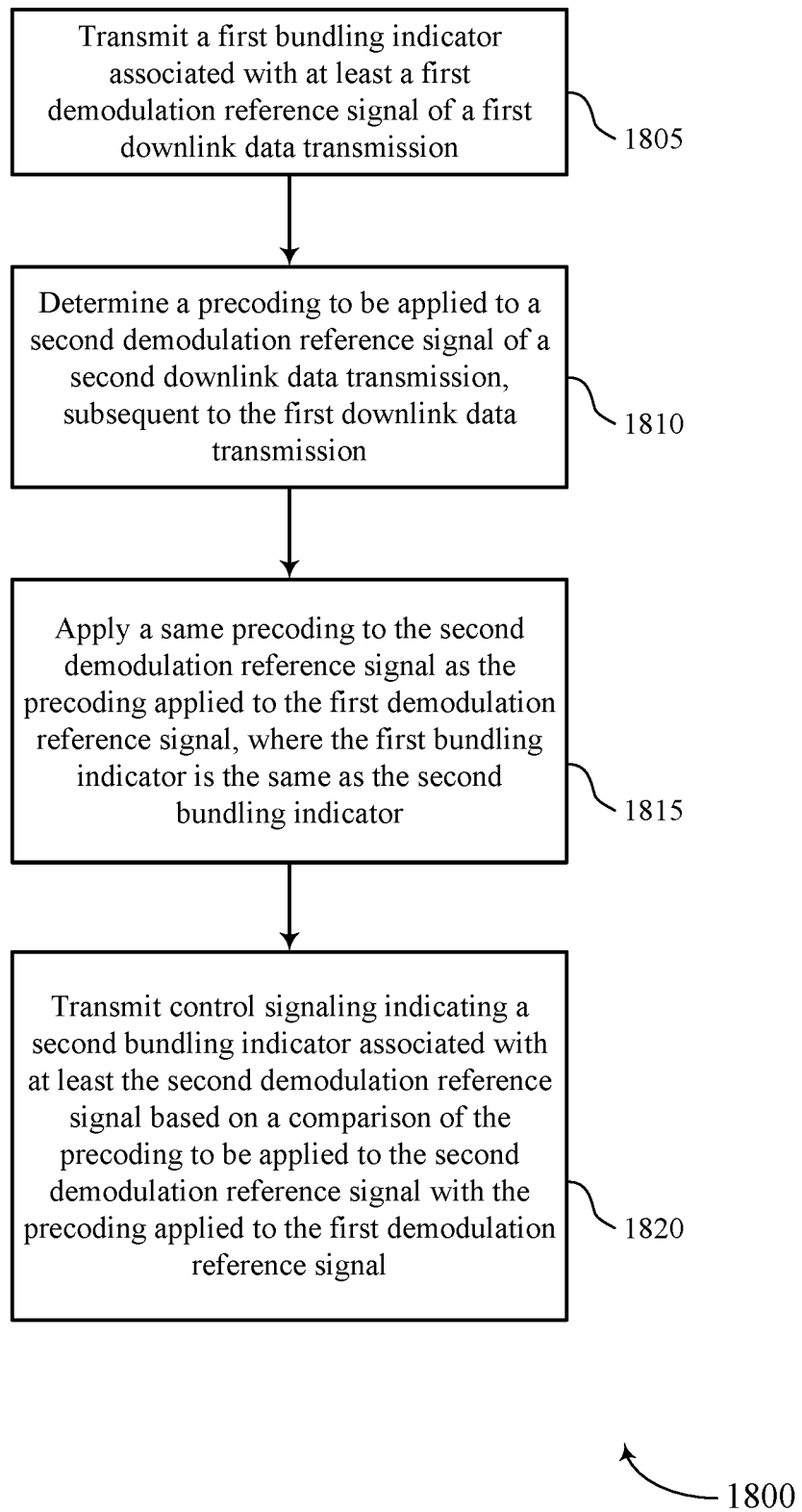

FIG. 18 shows a flowchart illustrating a method 1800 that supports triggering demodulation reference signal bundling in accordance with aspects of the present disclosure. The operations of method 1800 may be implemented by a base station 105 or its components as described herein. For example, the operations of method 1800 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1805, the base station may transmit a first bundling indicator associated with at least a first demodulation reference signal of a first downlink data transmission. The operations of 1805 may be performed according to the methods described herein. In some examples, aspects of the operations of 1805 may be performed by a bundling manager as described with reference to FIGS. 9 through 12.

At 1810, the base station may determine a precoding to be applied to a second demodulation reference signal of a second downlink data transmission, subsequent to the first downlink data transmission. The operations of 1810 may be performed according to the methods described herein. In some examples, aspects of the operations of 1810 may be performed by a precoder as described with reference to FIGS. 9 through 12.

At 1815, the base station may apply a same precoding to the second demodulation reference signal as the precoding applied to the first demodulation reference signal, where the first bundling indicator is the same as the second bundling indicator. The operations of 1815 may be performed according to the methods described herein. In some examples, aspects of the operations of 1815 may be performed by a precoder as described with reference to FIGS. 9 through 12.

At 1820, the base station may transmit control signaling indicating a second bundling indicator associated with at least the second demodulation reference signal based on a comparison of the precoding to be applied to the second demodulation reference signal with the precoding applied to the first demodulation reference signal. The operations of 1820 may be performed according to the methods described herein. In some examples, aspects of the operations of 1820 may be performed by a control signal component as described with reference to FIGS. 9 through 12.

Figure 19:
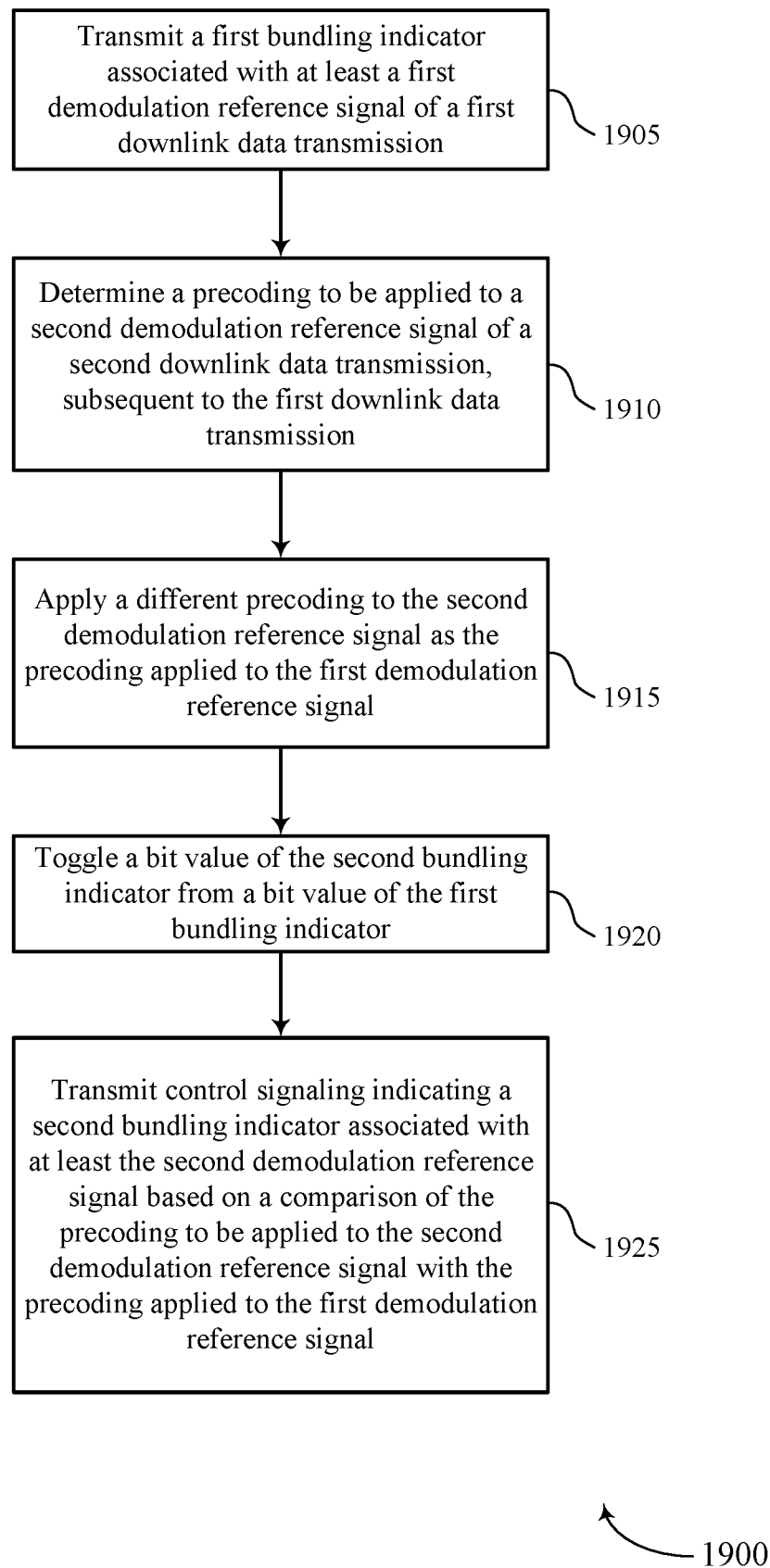

FIG. 19 shows a flowchart illustrating a method 1900 that supports triggering demodulation reference signal bundling in accordance with aspects of the present disclosure. The operations of method 1900 may be implemented by a base station 105 or its components as described herein. For example, the operations of method 1900 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1905, the base station may transmit a first bundling indicator associated with at least a first demodulation reference signal of a first downlink data transmission. The operations of 1905 may be performed according to the methods described herein. In some examples, aspects of the operations of 1905 may be performed by a bundling manager as described with reference to FIGS. 9 through 12.

At 1910, the base station may determine a precoding to be applied to a second demodulation reference signal of a second downlink data transmission, subsequent to the first downlink data transmission. The operations of 1910 may be performed according to the methods described herein. In some examples, aspects of the operations of 1910 may be performed by a precoder as described with reference to FIGS. 9 through 12.

At 1915, the base station may apply a different precoding to the second demodulation reference signal as the precoding applied to the first demodulation reference signal. The operations of 1915 may be performed according to the methods described herein. In some examples, aspects of the operations of 1915 may be performed by a precoder as described with reference to FIGS. 9 through 12.

At 1920, the base station may toggle a bit value of the second bundling indicator from a bit value of the first bundling indicator. The operations of 1920 may be performed according to the methods described herein. In some examples, aspects of the operations of 1920 may be performed by an indicator toggle as described with reference to FIGS. 9 through 12.

At 1925, the base station may transmit control signaling indicating a second bundling indicator associated with at least the second demodulation reference signal based on a comparison of the precoding to be applied to the second demodulation reference signal with the precoding applied to the first demodulation reference signal. The operations of 1925 may be performed according to the methods described herein. In some examples, aspects of the operations of 1925 may be performed by a control signal component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   identifying a first bundling indicator associated with at least a first demodulation reference signal of a first downlink data transmission;
   receiving control signaling indicating a second bundling indicator associated with at least a second demodulation reference signal of a second downlink data transmission subsequent to the first downlink data transmission;
   determining a precoding to be applied to the second demodulation reference signal based at least in part on a comparison of the first bundling indicator and the second bundling indicator; and
   determining whether to perform a bundling of the first demodulation reference signal and the second demodulation reference signal based at least in part on the comparison of the first bundling indicator and the second bundling indicator and a comparison of a first channel transmission property of the first downlink data transmission and a second channel transmission property of the second downlink data transmission.

2. The method of claim 1, wherein determining the precoding further comprises:
   determining a same precoding to be applied to the second demodulation reference signal as the precoding applied to the first demodulation reference signal based at least in part on the first bundling indicator and the second bundling indicator being the same.

3. The method of claim 2, wherein the same precoding is determined for a subset of physical resource blocks of the second demodulation reference signal and a subset of physical resource blocks of the first demodulation reference signal based at least in part on an overlap of resources for the first downlink data transmission and the second downlink data transmission.

4. The method of claim 2, further comprising:
   receiving a third demodulation reference signal, associated with a first downlink channel for a second UE, that is co-scheduled on a same time-frequency resource and different antenna port as the first demodulation reference signal associated with the first downlink data transmission of the first downlink channel; and
   receiving a fourth demodulation reference signal, associated with a second downlink channel for the second UE, that is co-scheduled on a same time-frequency resource and different antenna port as the second demodulation reference signal associated with the second downlink data transmission of the second downlink channel.

5. The method of claim 4, further comprising:
   determining the same precoding to be applied to the fourth demodulation reference signal as the precoding applied to the third demodulation reference signal based at least in part on the first bundling indicator and the second bundling indicator being the same.

6. The method of claim 4, further comprising:
   identifying a first co-scheduled port bundling indicator associated with the third demodulation reference signal;
   receiving a second co-scheduled port bundling indicator associated with the fourth demodulation reference signal in the control signaling; and determining a precoding to be applied to the fourth demodulation reference signal with respect to a precoding applied to the third demodulation reference signal based at least in part on a comparison of the first co-scheduled port bundling indicator and the second co-scheduled port bundling indicator.

7. The method of claim 1, further comprising:
evaluating the first channel transmission property and the second channel transmission property based at least in part on the first bundling indicator and the second bundling indicator being the same; and
determining a same precoding to be applied to the second demodulation reference signal as the precoding applied to the first demodulation reference signal based at least in part on the evaluation of the first channel transmission property and the second channel transmission property.

8. The method of claim 1, wherein the first channel transmission property and the second channel transmission property comprises a port identifier, a channel type, a demodulation reference signal pattern, a demodulation reference signal type, a virtual frequency resource allocation, a physical frequency resource allocation, or a combination thereof.

9. The method of claim 8, wherein the determining the same precoding to be applied to the second demodulation reference signal as the precoding applied to the first demodulation reference signal is based at least in part on the first channel transmission property and the second channel transmission property being the same.

10. The method of claim 1, wherein the first channel transmission property and the second channel transmission property comprises a time unit threshold, and the determining the same precoding to be applied to the second demodulation reference signal as the precoding applied to the first demodulation reference signal is based at least in part on the second demodulation reference signal being within a time period less than the time unit threshold from the first demodulation reference signal.

11. The method of claim 1, further comprising:
determining a different precoding to be applied to the second demodulation reference signal as the precoding applied to the first demodulation reference signal based at least in part on the second bundling indicator being different than the first bundling indicator, wherein the second bundling indicator being different than the first bundling indicator comprises a bit value of the second bundling indicator being toggled from a bit value of the first bundling indicator.

12. The method of claim 1, wherein the second demodulation reference signal comprises a plurality of semi-persistent scheduled demodulation reference signals, further comprising:
determining a same precoding to be applied to each semi-persistent scheduled demodulation reference signal of the plurality of semi-persistent scheduled demodulation reference signals based at least in part on the second bundling indicator; or
determining a different precoding to be applied to each semi-persistent scheduled demodulation reference signal of the plurality of semi-persistent scheduled demodulation reference signals based at least in part on the second bundling indicator.

13. An apparatus for wireless communication at a user equipment (UE), comprising: a processor, memory coupled with the processor; and instructions stored in the memory and executable by the processor to cause the apparatus to:

identify a first bundling indicator associated with at least a first demodulation reference signal of a first downlink data transmission;
receive control signaling indicating a second bundling indicator associated with at least a second demodulation reference signal of a second downlink data transmission subsequent to the first downlink data transmission;
determine a precoding to be applied to the second demodulation reference signal based at least in part on a comparison of the first bundling indicator and the second bundling indicator; and
determine whether to perform a bundling of the first demodulation reference signal and the second demodulation reference signal based at least in part on the comparison of the first bundling indicator and the second bundling indicator and a comparison of a first channel transmission property of the first downlink data transmission and a second channel transmission property of the second downlink data transmission.

14. The apparatus of claim 13, wherein the instructions to determine the precoding are further executable by the processor to cause the apparatus to:
determine a same precoding to be applied to the second demodulation reference signal as the precoding applied to the first demodulation reference signal based at least in part on the first bundling indicator and the second bundling indicator being the same.

15. The apparatus of claim 14, wherein the same precoding is determined for a subset of physical resource blocks of the second demodulation reference signal and a subset of physical resource blocks of the first demodulation reference signal based at least in part on an overlap of resources for the first downlink data transmission and the second downlink data transmission.

16. The apparatus of claim 14, wherein the instructions are further executable by the processor to cause the apparatus to:
determine a third demodulation reference signal, associated with a first downlink channel for a second UE, is co-scheduled on a same time-frequency resource and different antenna port as the first demodulation reference signal associated with the first downlink data transmission of the first downlink channel; and
receive a fourth demodulation reference signal, associated with a second downlink channel for the second UE, that is co-scheduled on a same time-frequency resource and different antenna port as the second demodulation reference signal associated with the second downlink data transmission of the second downlink channel.

17. The apparatus of claim 16, wherein the instructions are further executable by the processor to cause the apparatus to:
determine the same precoding to be applied to the fourth demodulation reference signal as the precoding applied to the third demodulation reference signal based at least in part on the first bundling indicator and the second bundling indicator being the same.

18. The apparatus of claim 16, wherein the instructions are further executable by the processor to cause the apparatus to:
identify a first co-scheduled port bundling indicator associated with the third demodulation reference signal;
receive a second co-scheduled port bundling indicator associated with the fourth demodulation reference signal in the control signaling; and determine a precoding to be applied to the fourth demodulation reference signal with respect to a precoding applied to the third demodulation reference signal based at least in part on a comparison of the first co-scheduled port bundling indicator and the second co-scheduled port bundling indicator.

19. The apparatus of claim 13, wherein the instructions are further executable by the processor to cause the apparatus to:
evaluate the first channel transmission property and the second channel transmission property based at least in part on the first bundling indicator and the second bundling indicator being the same; and
determine a same precoding to be applied to the second demodulation reference signal as the precoding applied to the first demodulation reference signal based at least in part on the evaluation of the first channel transmission property and the second channel transmission property.

20. The apparatus of claim 13, wherein the first channel transmission property and the second channel transmission property comprises a port identifier, a channel type, a demodulation reference signal pattern, a demodulation reference signal type, a virtual frequency resource allocation, a physical frequency resource allocation, or a combination thereof.

21. The apparatus of claim 20, wherein the determining the same precoding to be applied to the second demodulation reference signal as the precoding applied to the first demodulation reference signal is based at least in part on the first channel transmission property and the second channel transmission property being the same.

22. The apparatus of claim 13, wherein the first channel transmission property and the second channel transmission property comprises a time unit threshold, and the determining the same precoding to be applied to the second demodulation reference signal as the precoding applied to the first demodulation reference signal is based at least in part on the second demodulation reference signal being within a time period less than the time unit threshold from the first demodulation reference signal.

23. The apparatus of claim 13, wherein the instructions are further executable by the processor to cause the apparatus to:
determine a different precoding to be applied to the second demodulation reference signal as the precoding applied to the first demodulation reference signal based at least in part on the second bundling indicator being different than the first bundling indicator.

24. The apparatus of claim 23, wherein the second bundling indicator being different than the first bundling indicator comprises a bit value of the second bundling indicator being toggled from a bit value of the first bundling indicator.

25. The apparatus of claim 13, wherein the second demodulation reference signal comprises a plurality of semi-persistent scheduled demodulation reference signals, and the instructions are further executable by the processor to cause the apparatus to:
determine a same precoding to be applied to each semi-persistent scheduled demodulation reference signal of the plurality of semi-persistent scheduled demodulation reference signals based at least in part on the second bundling indicator; or
determine a different precoding to be applied to each semi-persistent scheduled demodulation reference signal of the plurality of semi-persistent scheduled demodulation reference signals based at least in part on the second bundling indicator.

26. An apparatus for wireless communication at a user equipment (UE), comprising:
means for identifying a first bundling indicator associated with a first demodulation reference signal of a first downlink data transmission;
means for receiving control signaling indicating a second bundling indicator associated with a second demodulation reference signal of a second downlink data transmission subsequent to the first downlink data transmission;
means for determining a precoding to be applied to the second demodulation reference signal based at least in part on a comparison of the first bundling indicator and the second bundling indicator; and
means for determining whether to perform a bundling of the first demodulation reference signal and the second demodulation reference signal based at least in part on the comparison of the first bundling indicator and the second bundling indicator and a comparison of a first channel transmission property of the first downlink data transmission and a second channel transmission property of the second downlink data transmission.

27. The apparatus of claim 26, further comprising:
means for determining a same precoding to be applied to the second demodulation reference signal as the precoding applied to the first demodulation reference signal based at least in part on the first bundling indicator and the second bundling indicator being the same.

28. The apparatus of claim 27, wherein the same precoding is determined for a subset of physical resource blocks of the second demodulation reference signal and a subset of physical resource blocks of the first demodulation reference signal based at least in part on an overlap of resources for the first downlink data transmission and the second downlink data transmission.

29. The apparatus of claim 26, further comprising:
means for evaluating a channel transmission property of the first downlink data transmission and the second downlink data transmission based at least in part on the first bundling indicator and the second bundling indicator being the same; and
means for determining a same precoding to be applied to the second demodulation reference signal as the precoding applied to the first demodulation reference signal based at least in part on the evaluation of the channel transmission property of the first downlink data transmission and the channel transmission property of the second downlink data transmission.

30. A non-transitory computer-readable medium storing code for wireless communication at a user equipment (UE), the code comprising instructions executable by a processor to:
identify a first bundling indicator associated with a first demodulation reference signal of a first downlink data transmission;
receive control signaling indicating a second bundling indicator associated with a second demodulation reference signal of a second downlink data transmission subsequent to the first downlink data transmission;
determine a precoding to be applied to the second demodulation reference signal based at least in part on a comparison of the first bundling indicator and the second bundling indicator; and determine whether to perform a bundling of the first demodulation reference signal and the second demodulation reference signal based at least in part on the comparison of the first bundling indicator and the second bundling indicator and a comparison of a first channel transmission property of the first downlink data transmission and a second channel transmission property of the second downlink data transmission.

* * * * *